US006542937B1

(12) United States Patent
Kask et al.

(10) Patent No.: US 6,542,937 B1
(45) Date of Patent: Apr. 1, 2003

(54) APPARATUS AND METHOD FOR TRANSFERRING AND EDITING SHEET METAL PART DATA

(75) Inventors: Kalev Kask, Irvine, CA (US); Dmitry Leshchiner, Irvine, CA (US); Liang Huang, Irvine, CA (US)

(73) Assignee: Amada Company, Limited, Kanagawa-Ken (JP)

( * ) Notice: Subject to any disclaimer, the term of this patent is extended or adjusted under 35 U.S.C. 154(b) by 0 days.

(21) Appl. No.: 09/031,666

(22) Filed: Feb. 27, 1998

(51) Int. Cl.[7] .................................................. G06F 9/00
(52) U.S. Cl. ...................... 709/328; 700/182; 709/315; 709/313
(58) Field of Search ................................ 709/328, 315, 709/313, 310; 700/182, 180, 165, 95, 97, 98; 706/919

(56) References Cited

U.S. PATENT DOCUMENTS

| 4,912,644 A | * | 3/1990 | Aoyama et al. | 700/98 |
|---|---|---|---|---|
| 5,379,432 A | * | 1/1995 | Orton et al. | 703/21 |
| 5,404,529 A | * | 4/1995 | Chernikoff et al. | 703/27 |
| 5,473,777 A | * | 12/1995 | Moeller et al. | 709/315 |
| 5,475,845 A | * | 12/1995 | Orton et al. | 703/26 |
| 5,627,949 A | * | 5/1997 | Letcher, Jr. | 345/420 |
| 5,689,711 A | * | 11/1997 | Bardasz et al. | 395/701 |
| 5,815,154 A | * | 9/1998 | Hirschtick et al. | 345/356 |
| 5,822,207 A | * | 10/1998 | Hazama et al. | 700/97 |
| 5,828,575 A | * | 10/1998 | Sakai | 700/182 |
| 5,864,482 A | * | 1/1999 | Hazama et al. | 700/182 |
| 5,886,897 A | * | 3/1999 | Hazama et al. | 364/474.24 |
| 5,971,589 A | * | 10/1999 | Hazama et al. | 700/145 |
| 6,065,857 A | * | 5/2000 | Hazama et al. | 700/165 |
| 6,144,896 A | * | 11/2000 | Kask et al. | 700/165 |
| 6,185,476 B1 | * | 2/2001 | Sakai | 345/964 |
| 6,212,441 B1 | * | 4/2001 | Hazama et al. | 345/420 |
| 6,219,586 B1 | * | 4/2001 | Sakai | 700/165 |
| 6,243,611 B1 | * | 6/2001 | Hazama et al. | 700/97 |
| 6,327,514 B1 | * | 12/2001 | Hazama et al. | 700/145 |

OTHER PUBLICATIONS

Mliki, Mohamed et al. "Dimensioning and Functional Tolerancing Aided by Computer in CAD/CAM Systems". IEEE, Apr. 1995, p. 421–428.*
Prasad et al. "CADDS: an automated die design system for sheet–metal blanking" Computing and Control Engineering Journal. Jul. 1992, p. 185–191.*

* cited by examiner

Primary Examiner—St. John Courtenay, III
Assistant Examiner—Lewis A. Bullock, Jr.
(74) Attorney, Agent, or Firm—Greenblum & Bernstein, P.L.C.

(57) ABSTRACT

An apparatus and method are disclosed for transferring part data, such as sheet metal part data, between computer-based application or CAD environments and for editing such part data. The application environments may include a 2-D CAD program environment and an object oriented bend model program environment. An interface is provided through which a 2-D CAD system may access data from the object oriented bend model system and by which data may be transferred between the systems to permit editing and updating of the part model within and from both applications. The interface may be implemented through a library or set of application program interface (API) functions and a message-based protocol (such as dynamic data exchange (DDE)) to facilitate the exchange of sheet metal part data. Various editing capabilities or tools may also be provided to enable, for example, the attachment of faces of the part or the shifting of one face relative to another face of the part.

45 Claims, 32 Drawing Sheets

Tangent

Intersection

Realistic

Conceptual

FIG. 7A

| length of buffer | # of faces (N) | N face names | N faces |
|---|---|---|---|
| long (4 bytes) | long (4 bytes) | N x long (4 bytes) | N X face format |

FIG. 7B

| length of buffer | # of holes (H) | bounding loop | H hole-loops |
|---|---|---|---|
| long (4 bytes) | long (4 bytes) | loop format | H X loop format |

FIG. 18B
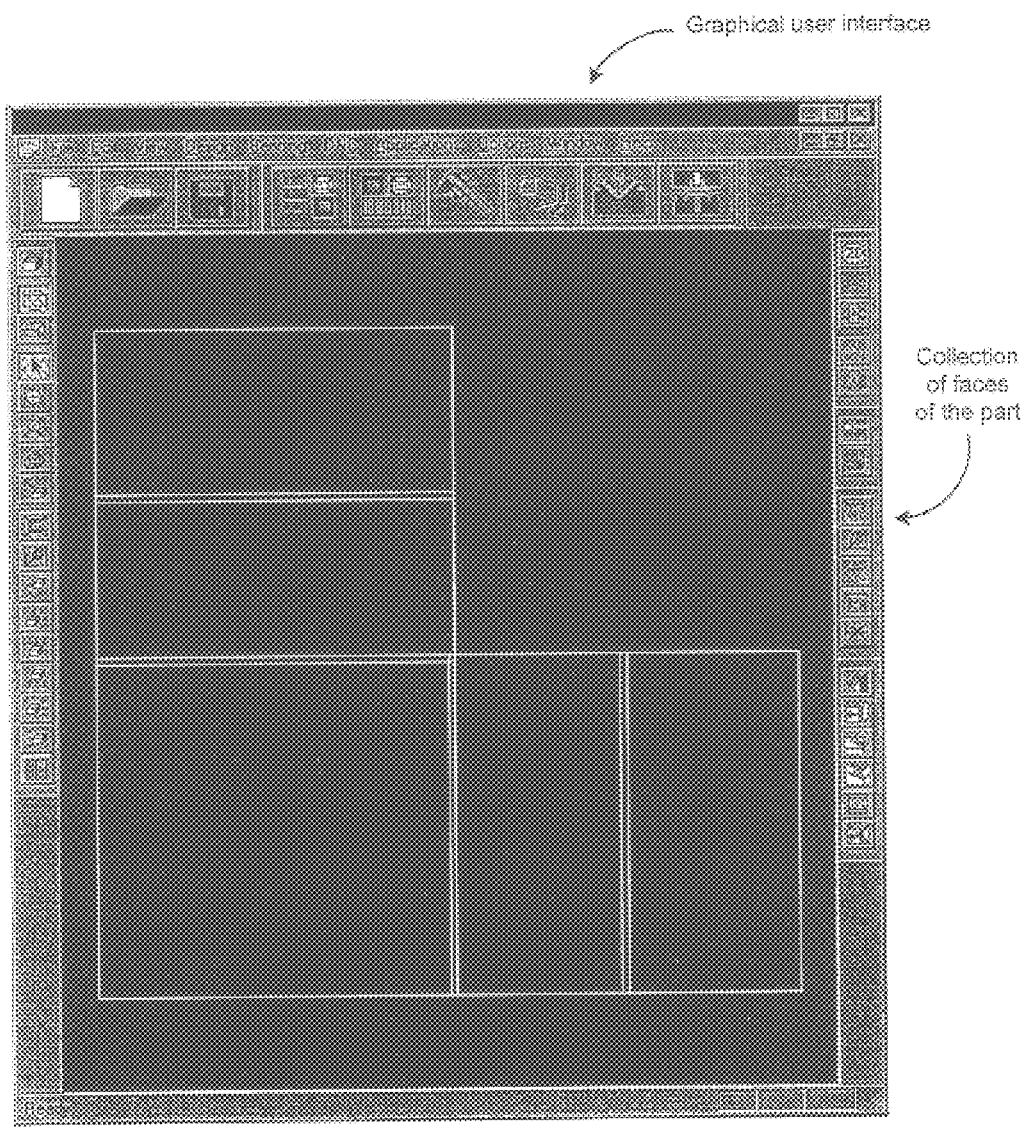

APPARATUS AND METHOD FOR TRANSFERRING AND EDITING SHEET METAL PART DATA

RELATED APPLICATION DATA

The present application contains subject matter which is related to co-pending, commonly assigned U.S. patent application Ser. No. 08/690,671, filed on Jul. 31, 1996, in the names of Kensuke HAZAMA et al., entitled "Apparatus and Method for Managing and Distributing Design and Manufacturing Information Throughout a Sheet Metal Production Facility", the disclosure of which is expressly incorporated herein by reference in its entirety.

BACKGROUND OF THE INVENTION

1. Field of the Invention

The present invention generally relates to the field of computer-aided design (CAD) systems and the use of such systems for modeling parts, such as sheet metal parts. More particularly, the present invention relates to an apparatus and method for transferring part data, such as sheet metal part data, between computer-based application or CAD environments and for editing such part data.

2. Background Information

The production of parts, such as sheet metal parts, has traditionally included a design and modeling stage during which a sheet metal part design is developed based on a customer's specifications. A customer will typically place an order for a particular sheet metal component to be produced at a sheet metal manufacturing or production facility. The customer's order will usually include basic product and design information so that the component may be manufactured by the factory. This information may include, for example, the geometric dimensions of the part, the material required for the part (e.g., steel, stainless steel, aluminum, etc.), special forming information, the batch size, the delivery date, etc. The sheet metal part requested by the customer may be designed and produced for a wide variety of applications. For example, the produced component may ultimately be used as an outer casing for a computer, an electrical switchboard, an armrest in an airplane, or part of a door panel for a car.

During the design and modeling stage, a sheet metal part design may be developed by a design office of the manufacturing facility using a computer-aided design (CAD) system. Based on a customer's specifications, a two-dimensional (2-D) model of the sheet metal part may be developed by a design programmer with the CAD system. A customer may provide a blueprint containing one or more drawings of the component and the critical geometric dimensions of the part. The blueprint may also indicate any special forming or marking to be included in the part, as well as the location of holes or other types of openings on the surface(s) of the sheet metal part. The design programmer will often use this blueprint and/or other information from the customer to develop a 2-D model on the CAD system. The 2-D model may include a flat view and one or more other perspective views of the sheet metal part, with bendline and/or dimensional information. A customer may also sometimes provide raw 2-D CAD data (e.g., saved in a computer-readable file) to the manufacturing facility, that requires editing or refinement during the design stage.

The design and modeling of sheet metal parts with such conventional CAD systems suffers from several drawbacks and disadvantages. For example, most 2-D CAD systems have limited modeling and editing capabilities. Further, although three-dimensional (3-D) modeling has been recently provided in commercially available CAD systems, such systems cannot communicate and transfer sheet metal part data with other CAD or computer-based modeling systems. That is, sheet metal data may only be transferred between computer-based modeling and design systems by uploading or downloading files containing the sheet metal part data. The use of such data files causes several disadvantages, including the requirement that compatible, data file formats be used by the systems. Further, prior systems do not permit the design programmer to easily convert an existing 2-D CAD model of a part into a 3-D representation of the part.

An additional drawback with prior systems exists due to the limited information that is stored with the sheet metal part data. That is, while the part model data normally includes information concerning the overall part geometry, manufacturing information and production constraints are not included with the part model data. In co-pending, commonly assigned U.S. patent application Ser. No. 08/690, 671, an object oriented data model is disclosed which includes part geometry and topology information, as well as manufacturing data for the sheet metal part. According to the disclosed object oriented data model, a bend model for the sheet metal part is defined as a completely self-contained class library. All of the required data manipulation and functions for the sheet metal part (e.g., folding, unfolding, etc.) are captured as member functions of the class library. Further, all of the geometrical and topological data are defined in objects that are grouped within the bend model. The geometrical data includes both 2-D and 3-D representations of the part.

The use of an object oriented bend model, such as that disclosed in U.S. patent application Ser. No. 08/690,671, provides several advantages. For example, an object oriented bend model provides a more comprehensive and realistic model of the sheet metal part, that includes both geometrical and topological information, as well as manufacturing information. Further, the use of an object oriented bend model provides greater flexibility and allows a design programmer to more easily modify or edit various features and attributes of the part, such as the faces, bendlines and bending properties of the part.

Currently, there exists a need to provide an interface between conventional CAD systems, such as 2-D CAD systems, and modeling systems employing an object oriented bend model, such as that disclosed in U.S. patent application Ser. No. 08/690,671. Such an interface is required that permits part data to be transferred between these systems and that provides greater flexibility in the editing and modeling of the part. With such an interface, it would be possible to integrate object oriented bend model systems with existing 2-D CAD systems and other conventional CAD systems.

Many advantages would exist by integrating such systems. For example, such an integration would permit new, object oriented bend model systems to be utilized with existing CAD systems. This type of an interface would also permit design programmers to take advantage of pre-existing editing features provided in prior CAD systems, while still maintaining the benefits of an object oriented data model system. Since many design programmers are fully accustomed or skilled with using conventional CAD systems, such an integration would enhance the efficiency of the designing and modeling stages for manufacturing the part, and would permit businesses and facilities to maintain use of existing or legacy CAD systems, while having full utilization of newer modeling systems, such as object oriented bend model systems.

SUMMARY OF THE INVENTION

In view of the foregoing, the present invention, through one or more of its various aspects, embodiments and/or specific features or sub-components thereof, is provided to bring about one or more objects and advantages, such as those specifically noted below.

A general object of the present invention is to provide an apparatus and method for transferring and editing part data, such as sheet metal part data. Another object of the invention is to improve the efficiency of part modeling and design.

Still a further object of the present invention is to provide an interface that facilitates the transfer of part-related data between computer-based application environments, such as a 2-D CAD system and an object oriented bend model system.

Another object of the invention is to provide an apparatus and method for transferring data related to a sheet metal part, whereby the data may be transferred in real time in order to avoid the need to upload or download the part data from a data file.

Yet another object of the present invention is to provide an apparatus and method for transferring sheet metal part data, wherein the part data may be transferred in various modes, including a faces mode in which the faces of the part are collectively transferred by the interface. In addition, the part data may be transferred in a flat mode whereby the part data is sent as an entire flat part with manufacturing related data.

Another object of the invention is to provide enhanced editing features which permit various features (e.g., a face or bendline) and parameters (e.g., bending parameters) of the part to be edited or modified and transferred in real time.

In accordance with an aspect of the invention, an interface for transferring part data between two application environments is provided, wherein one of the application environments includes a computer-aided design (CAD) program and the other of the application environments includes an object oriented bend model program. The interface may include: an inter-process communication system that establishes an inter-process communication path between the CAD program and the bend model program; and a library of application program interface (API) functions that may be called by the CAD program and the bend model program to transfer and exchange part data through the inter-process communication path. The inter-process communication path of the interface may be established in accordance with a predetermined message protocol, such as dynamic data exchange (DDE).

Preferably, the part data comprises data defining a sheet metal part including a plurality of faces, and the library of API functions includes a Send_Faces function for transferring the data defining the sheet metal part as a collection of attached faces. In such a case, the data that is transferred with the Send_Faces function may be provided in a buffer that comprises a part name, a set of face data, and bending parameter data. In addition, the set of face data may include loop data for each face of the sheet metal part, wherein the loop data includes data defining a bounding loop of each face of the part.

The library of API functions may also include an Add_Face function for transferring face data defining a face that is to be added to the data defining the sheet metal part. The set of input data that is provided to the Add_Face function may include a part name, a face name, and the face data. In addition, the face data may include loop data defining a bounding loop of the face to be added to the sheet metal part.

In accordance with the invention, the library of API functions may further comprise a Delete_Face function for transferring face data defining a face that is to be deleted from the data defining the sheet metal part. In such a case, the set of input data that is provided to the Delete_Face function may include a part name and a face name of the face to be deleted from the sheet metal part. If a Delete_Bendline function is provided as an API function for transferring data defining a bendline that is to be deleted from the sheet metal part, then the set of input data that is provided to the Delete_Bendline function may include a part name, a name of a first face of the sheet metal part that is adjacent to the bendline to be deleted, and a name of a second face of the sheet metal part that is adjacent to the bendline to be deleted.

The library of API functions may also include an Attach_Faces function for transferring data defining faces of the sheet metal part that are to be attached. The data transferred by the Attach_Faces function may include a buffer comprising a part name, a set of edge names of a first face of the sheet metal part that is to be attached, a set of edges names of a second face of the sheet metal part that is to be attached, and attachment parameters for attaching the edges of the first and second faces. In addition, a Set_Bending_Parameters function may be provided for transferring data defining bending parameters that are to be set for a bendline of the sheet metal part that is defined between a first adjacent face and a second adjacent face. For this function, a set of input data may be provided that includes a part name, a name of the first adjacent face, a name of the second adjacent face, and the bending parameters that are to be set for the bendline. Further, the bending parameters that are transferred with the Set_Bending_Parameters function may include a bending angle, a bend type, a bend deduction amount, and/or an inside radius of the bend.

Still further, the library of API functions for the interface may include a Shift_Face function for transferring data defining a second face of the sheet metal part that is to be shifted with respect to a first face of the sheet metal part. The data that is transferred by the Shift_Face function may include a buffer comprising a part name, a name of the first face, a name of the second face, and a shift amount indicating the amount by which the second face is to be shifted with respect to the first face. In addition, the library of API functions may include a Send_Flat function for transferring the data defining the sheet metal part as a flat version of the part. With this function, the data that is transferred may be provided in a buffer that comprises a part name, a set of edges defining the flat version of the part, and a set of default bending parameters for the part. A Send_Folded function may also be included to permit the transferring of the data defining the sheet metal part as a folded version of the part. The data that is transferred with the Send_Folded function may be provided in a buffer that comprises a part name, and a set of edges defining the folded version of the part.

In accordance with another aspect of the invention, a method is provided for transferring part data between two application environments, including a computer-aided design (CAD) program and a bend model program. The method comprises: establishing an inter-process communication path between the CAD program and the bend model program; defining a library of application program interface (API) functions that may be called by the CAD program and the bend model program to transfer part data through the inter-process communication path; calling one of the API functions of the library; and transferring part data between the CAD program and the bend model program based on the API function that was called from the library.

In the disclosed method, the part data may comprise data defining a sheet metal part including a plurality of faces. In addition, the method may further comprise calling a Send_Faces function from the library and transferring the data defining the sheet metal part as a collection of attached faces in response to the Send_Faces function being called from the library. The method may also include providing, when the Send_Faces function is called from the library, a buffer that comprises a part name, a set of face data, and bending parameter data in order to transfer the data defining the sheet metal part. The set of face data may comprise loop data for each face of the sheet metal part, wherein the loop data includes data defining a bounding loop of each face.

The method may also comprise calling an Attach_Faces function from the library and transferring, in response to the Attach_Faces function being called from the library, data defining faces of the sheet metal part that are to be attached. In such a case, the method may further comprise providing, when the Attach_Faces function is called from the library, a buffer comprising a part name, a set of edge names of a first face of the sheet metal part that is to be attached, a set of edges names of a second face of the sheet metal part that is to be attached, and attachment parameters for attaching the edges of the first and second faces.

The library of functions that are called with the disclosed method may also include a Shift_Face function. In such a case, the method may further include transferring, when the Shift_Face function is called from the library, data defining a second face of the sheet metal part that is to be shifted with respect to a first face of the sheet metal part. In addition, the method may include providing, when the Shift_Face function is called from the library, a buffer comprising a part name, a name of the first face, a name of the second face, and a shift amount indicating the amount by which the second face is to be shifted with respect to the first face.

Further, the method may comprise calling a Send_Flat function and transferring, when the Send_Flat function is called from the library, the data defining the sheet metal part as a flat version of the part. The method may also include providing, when the Send_Flat function is called from said library, a buffer that comprises a part name, a set of edges defining the flat version of the part, and a set of default bending parameters for the part.

In accordance with yet another aspect of the invention, a method is provided for transferring sheet metal part data between two application environments, including a computer-aided design (CAD) program and an object-oriented bend model program. The method comprises: establishing an inter-process communication path between the CAD program and the bend model program; defining a library of application program interface (API) functions to transfer part data through the inter-process communication path; determining a set of input data for one of the API functions of said library; calling one of the API functions and providing, as input to the called API function, the set of input data; and transferring, with the inter-process communication path, the set of input data between the CAD program and the bend model program in accordance with the called API functions that was called from the library.

According to the disclosed method, the act of determining a set of input data may comprise: identifying a part name of the sheet metal part; identifying a set of edge of a first face of the sheet metal part that is to be attached; identifying a set of edges of a second face of the sheet metal part that is to be attached to the set of edges of the first face; defining attachment parameters for attaching the edges of the first and second faces; and providing, as the set of input data, the part name, a set of edge names of the edges of the first face of the sheet metal part, a set of edges names of the edges of the second face of the sheet metal part, and the attachment parameters for attaching the edges of the first and second faces. The method may also further comprise calling an Attach_Faces function from the library of API functions to transfer the set of input data and attach the first and second faces of the sheet metal part.

Moreover, in the disclosed method, the act of determining a set of input data may comprise: identifying a part name of the sheet metal part; identifying a first face of the sheet metal part; identifying a second face of the sheet metal part that is to be shifted with respect to the first face; defining a shift amount for shifting the second face with respect to the first face; and providing, as the set of input data, the part name, a name of the first face of the sheet metal part, a name of the second face of the sheet metal part, and the shift amount. In addition, the method may also include calling a Shift_Face function from the library of API functions to transfer the set of input data and shift the second face with respect to the firs face of the sheet metal part.

Further features and/or variations may be provided in addition to those noted above. For example, the invention may be directed to various combinations and subcombinations of the above-described features and/or combinations and subcombinations of several further features that are discussed below in the detailed description.

The above-listed and other objects, features and advantages of the present invention will be more fully set forth hereinafter.

BRIEF DESCRIPTION OF THE DRAWINGS

The present invention is further described in the detailed description which follows, by reference to the noted plurality of drawings by way of non-limiting examples or preferred embodiments of the present invention, in which like reference numerals represent similar parts throughout the illustrations, and wherein:

FIGS. 7A and 7B illustrate exemplary data structures and formats of buffers for transferring the part-related data as a collection of faces or transferring data of a single face of the part;

FIGS. 18A and 18B are illustrations of views of a part resulting from different transfer modes, including a flat mode and faces mode;

DETAILED DESCRIPTION OF THE INVENTION

Figure 1:
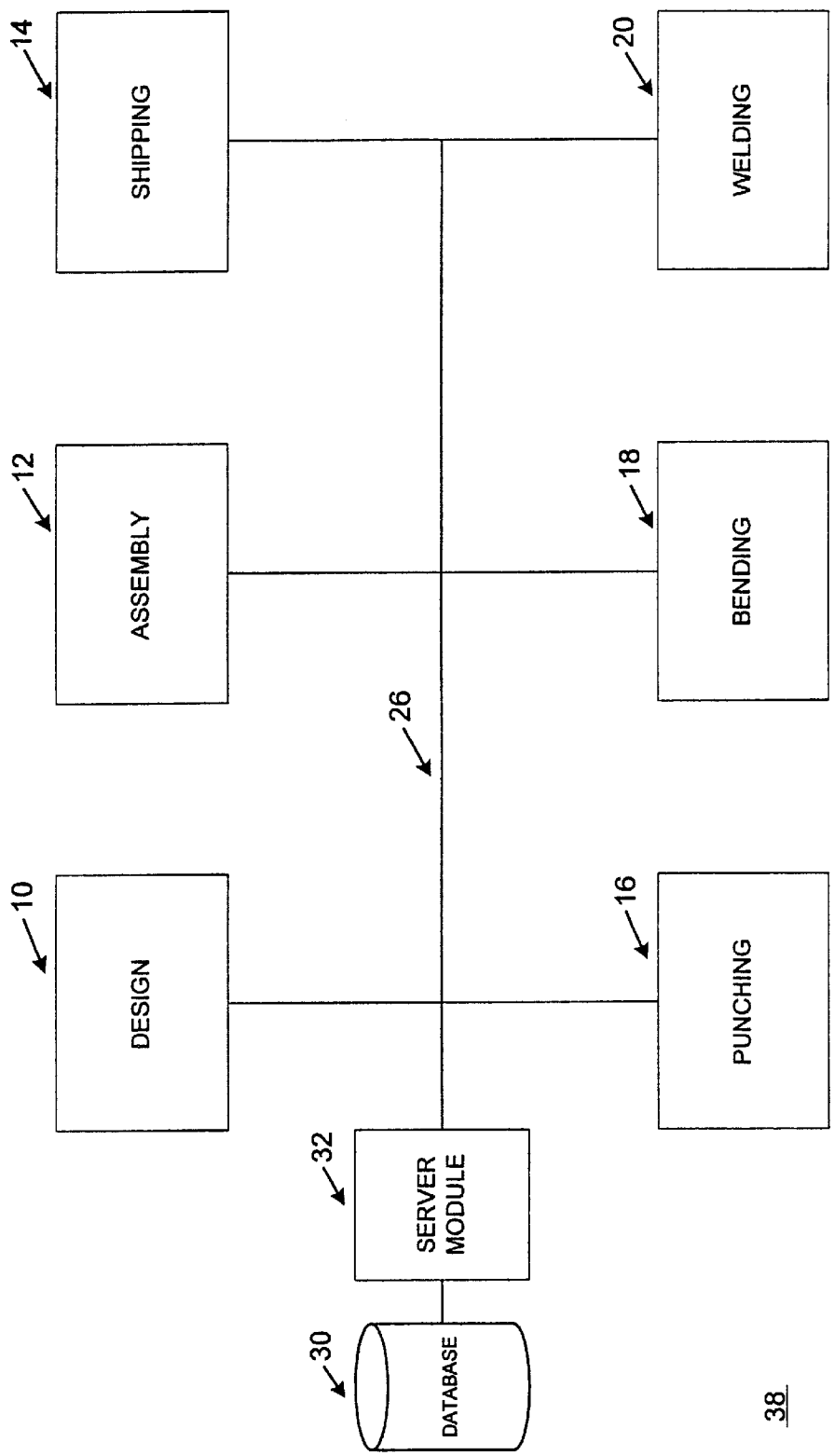
FIG. 1 is a block diagram illustration of an exemplary sheet metal manufacturing facility in which the features and aspects of the present invention may be applied.

By way of non-limiting embodiments and examples, the present invention will now be described with reference to the accompanying drawings, in which like reference numerals represent similar parts and/or features.

According to an aspect of the invention, an apparatus and method are provided for transferring and editing part-related data. In the following detailed description, the features of the invention are described with reference to sheet metal part data. The invention, however, is not limited to the application of sheet metal parts, but may also be applied to a wide variety of parts or products that are manufactured based on a computer or software generated design/model. For example, in addition to applying the various features of the invention to the production of sheet metal parts, the invention may also be applied to the manufacture or production of plastic molded parts and other types of metal or material formed parts.

Through the features of the present invention, an interface is provided for transferring part data, such as sheet metal part data, between computer-based applications or platforms that are utilized to design and model the part that is to be produced. In the disclosed embodiments and examples, the interface may be provided between a conventional or commercially available 2-D CAD system and an object oriented bend model system, such as that disclosed in U.S. patent application Ser. No. 08/690,671. The object oriented bend model system may provide both 2-D and 3-D modeling and viewing capabilities, and represent the part in an object oriented bend model that includes part geometry and manufacturing information. The object oriented bend model system may be include BendCAD, which is commercially available from Amada Co., Ltd. The 2-D CAD system may include a conventional 2-D CAD system, such as the AP100, FABRIWIN CAD, or AmpCAD system that is commercially available from Amada Co., Ltd. As further described below, the features of the invention provide an interface by which a 2-D CAD system may access data from the object oriented bend model system and in which data may be transferred between the systems in real time to permit editing and updating of the part model within and from both applications. As a result, the need to utilize and transfer data files with a generic or compatible format is eliminated and a generic interface or data connection is provided to provide communication and transfer of data between a 2-D CAD system and an object oriented bend model system.

As will be apparent from the present disclosure, the invention may be used for various applications and uses. For example, the features of the invention may be utilized for the initialized input of data relating to a sheet metal part. In such a case, the 2-D representation of the part that is originally developed in a 2-D CAD system may be transferred to an object oriented bend model system to develop a 3-D representation of the part and the complete object oriented bend model of the part. In addition, the features of the invention may be utilized to modify or edit the data of a sheet metal part presently existing within the object oriented bend model system. In this case, an operator may send part data back to the 2-D CAD system to permit modification and editing of the part data with one or more editing tools provided in the conventional CAD system. Thereafter, updates to the part data may be sent back to the object oriented bend model system to provide nearly simultaneous or real-time updating and transfer of the part data. The unique editing features of the invention may also be utilized to modify or edit the sheet metal part data and to transfer these updates or changes to the part between application environments. The various editing functions of the invention may be provided as add-on functions to a conventional 2-D CAD system and/or may be provided and implemented in an object oriented bend model system.

The features of the invention may also be implemented in various environments. FIG. 1 illustrates in block diagram form an exemplary sheet metal manufacturing facility 38 in which the features and aspects of the invention may be provided. Specifically, as shown in FIG. 1, the sheet metal manufacturing facility or factory 38 may include a plurality of locations 10, 12, 14 . . . 20 that are dispersed throughout the factory. These locations may include a design office 10, an assembly station 12, a shipping station 14, a punching station 16, a bending station 18 and a welding station 20. Although the sheet metal factory 38 in FIG. 1 is illustrated as including six discrete locations, the factory may of course include more than six discrete locations and may also include more than one location for each type of office or station illustrated in FIG. 1. For example, depending on the size or production capacity requirements for the facility 38, more than one punching station 16, bending station 18, and/or welding station 20 may be provided. In addition, the factory 38 may include more than one design office 10, assembly station 12 or shipping station 14 and may also include other types of locations for facilitating the design, production and manufacturing of components such as bent sheet metal components.

Each of the locations 10, 12, 14 . . . 20 within the factory 38 may be adapted and include equipment to execute one or more of the discrete production manufacturing stages or processes associated with the production and manufacturing of the components. For example, the design office 10 may include a CAD system to facilitate the design modeling of a sheet metal part based on a customer's specification. The CAD system may comprise one or more personal computers or workstations, a display unit, a printer and commercially available CAD software. By way of non-limiting examples, the CAD system of design office 10 may include the AP100, FABRIWIN CAD, and/or AmpCAD system that is available from Amada Co., Ltd. In addition, other commercially available CAD or CAD/CAM systems may be used, such as VELLUM, which is a Windows based CAD system available from Ashlar Incorporated. With the CAD software, a design programmer may develop a 2-D model of the sheet metal part based on the drawings and specifications provided in a customer's order. The design programmer may also generate control code based on the sheet metal part design in order to generate a part program for controlling, for example, CNC punch presses and/or bending machinery to punch and/or bend the sheet metal component from stock material.

Punching station 16 and bending station 18 may each be provided with any combination of CNC and/or NC based machine tools to facilitate the production and manufacture of the sheet metal parts. For example, punching station 16 may include one or more CNC and/or NC punch presses, such as COMA Series and/or PEGA Series Amada turret punch presses or other commercially available CNC and/or NC punch presses. Further, bending station 18 may include one or more CNC and/or NC press brakes, such as RG Series Amada press brakes or other commercially available multiple-access, gauging press brakes. In addition, welding station 20 may be provided with appropriate welding machinery in order to effectuate any required welding to the sheet metal component. Punching station 16, bending station 18 and welding station 20 are exemplary stations that may be provided in the factory 38, and other stations with appropriate equipment may be provided in combination or substitution for these stations depending on the type of parts that are to be manufactured. For example, factory 38 may also include a molding station (not shown) with molding equipment for producing various molded components. Further, automated or robot assisted machinery may also be provided at any of these locations to facilitate the manufacture of parts.

As further shown in FIG. 1, the sheet metal facility 38 may also include an assembly station 12 and shipping station 14. Assembly station 12 and shipping station 14 may include the necessary packaging, routing and/or transportation equipment to facilitate the assembly and shipping of the manufacturing components to the customer. The assembly and shipping of the components may be performed or controlled manually by factory personnel or may be machine automated and/or assisted. In addition, assembly station 12 and shipping station 14 may be physically located near the factory floor (e.g., in close proximity to punching station 16, bending station 18 and/or welding station 20) or within a separate facility or area of the sheet metal facility 38.

An object oriented bend model system, which may include for example BendCAD which is available from Amada Co., Ltd., may be implemented as a server-based application. For this purpose, as shown in FIG. 1, a server module 32 may be provided in production facility 38. Server module 32 may include software or firmware for implementing the various features of the bend model system, such as those described in U.S. patent application Ser. No. 08/690, 671. Further, server module 32 may include a database 30 for storing the design and manufacturing information associated with each sheet metal part. Database 30 may be implemented by any commercially available database with sufficient memory capacity for storing the design and manufacturing information of the factory's customers and storing other data, tables and/or programs. For example, database 30 may comprise a SCSI memory disk with sufficient memory space. The design and manufacturing information that is stored in database 30 may be accessed and distributed to the various locations 10, 12, 14 . . . 20 within the sheet metal facility 38 via a communications network 26. Various data formats, such as structured query language (SQL) may be used for accessing and storing data to database 30. In addition, information that is stored in database 30 may be backed-up and stored on a wide variety of storage medium, such as magnetic tape, optical disk or floppy disks.

Server module 32 and database 30 may be connected to communications network 26 at a separate area or location within the factory 38, as shown for example in FIG. 1, or at a location that is within or in close proximity to one of the factory stations (e.g., within design office 10). Further, although the embodiment of FIG. 1 depicts database 30 as being part of server module 32 and interfacing with communications network 26 via the server module, database 30 may be physically located separately from server module 32 and connected to communications network 26 via a network database module (not shown).

As discussed above, communications network 26 may interconnect each of the various locations 10, 12, 14 . . . 20 of the facility 38 with server module 32 and database 30. Communications network 26 may comprise any network capable of transmitting data and information to and from locations 10, 12, 14 . . . 20 and the server module 32 and database 30. Such transmission may be achieved electronically, optically, by RF transmission and/or by infrared transmission. By way of a non-limiting example, communications network 26 may be implemented by a local area network (LAN), or an equivalent network structure. Further, each of the locations 10, 12, 14 . . . 20 may also include station modules having network terminating equipment (such as a computer, minicomputer or workstation) and/or peripheral devices (such as a display monitor or screen, printers, CD-ROMs and/or modems) to transmit and receive information over communications network 26. The network terminating equipment and peripheral devices may include hardware and appropriate software or program logic for interfacing with communications network 26 and providing the various features and aspects of the bend model system. As noted above, the bend model system may include features such as those provided in BendCAD or that disclosed in U.S. patent application Ser. No. 08/690,671. If a computer is provided at a location or station of the facility 38, the computer may be a stand-alone, personal computer or a general purpose computer that is part of an interface device, equipment or machinery provided at the location. For example, the computer may be an IBM compatible personal computer or may be a computer that is part of any interface/control system of the machine, such as an Amada AMNC system. Server module 32 may also comprise network terminating equipment, such as a personal computer, minicomputer or miniframe, with suitable hardware and software for interfacing with communications network 26.

Although the object oriented bend model system is depicted as being implemented as part of server module 32, it is also possible to provide the features of the bend model system on a workstation or computer that also includes a CAD system, such as a 2-D CAD system. In such a case, a single workstation or personal computer may be provided with separate software for implementing the 2-D CAD program and the object oriented bend model program. The workstation may be provided at, for example, a design office of a facility. In such a local working environment, a multitasking operating system software, such as Windows NT available from Microsoft Corp., may be utilized to permit the 2-D CAD program and the object oriented bend model program to run simultaneously on the workstation.

As further discussed below, the present invention may be implemented as a functional interface layer between a CAD program and an object oriented bend model program. This interface may implemented by creating a set of application program interface (API) functions that allow an operator of the CAD program to create and/or manipulate an object oriented bend model of a part accessed from the bend model system. An embodiment of such an interface is discussed below with reference to Table 1. Further, an exemplary object oriented data model that may be utilized to represent the sheet metal part and an exemplary bend model viewer that may accompany the bend model are described below with reference to FIGS. 2 and 3.

The design and manufacturing information that is stored in, for example, database 30 may include a bend model data file comprising part geometry and topology data, as well as manufacturing data for the sheet metal part. The bend model data file may be implemented as an object oriented data model with a data structure and access algorithm such as that depicted in FIG. 2. In addition, a bend model viewer may be provided to interpret the bend model and display visual images of the part in 2-D and/or 3-D space representation. FIG. 3 illustrates a block diagram of an exemplary structure of a bend model viewer and its relation to the bend model.

Figure 2:
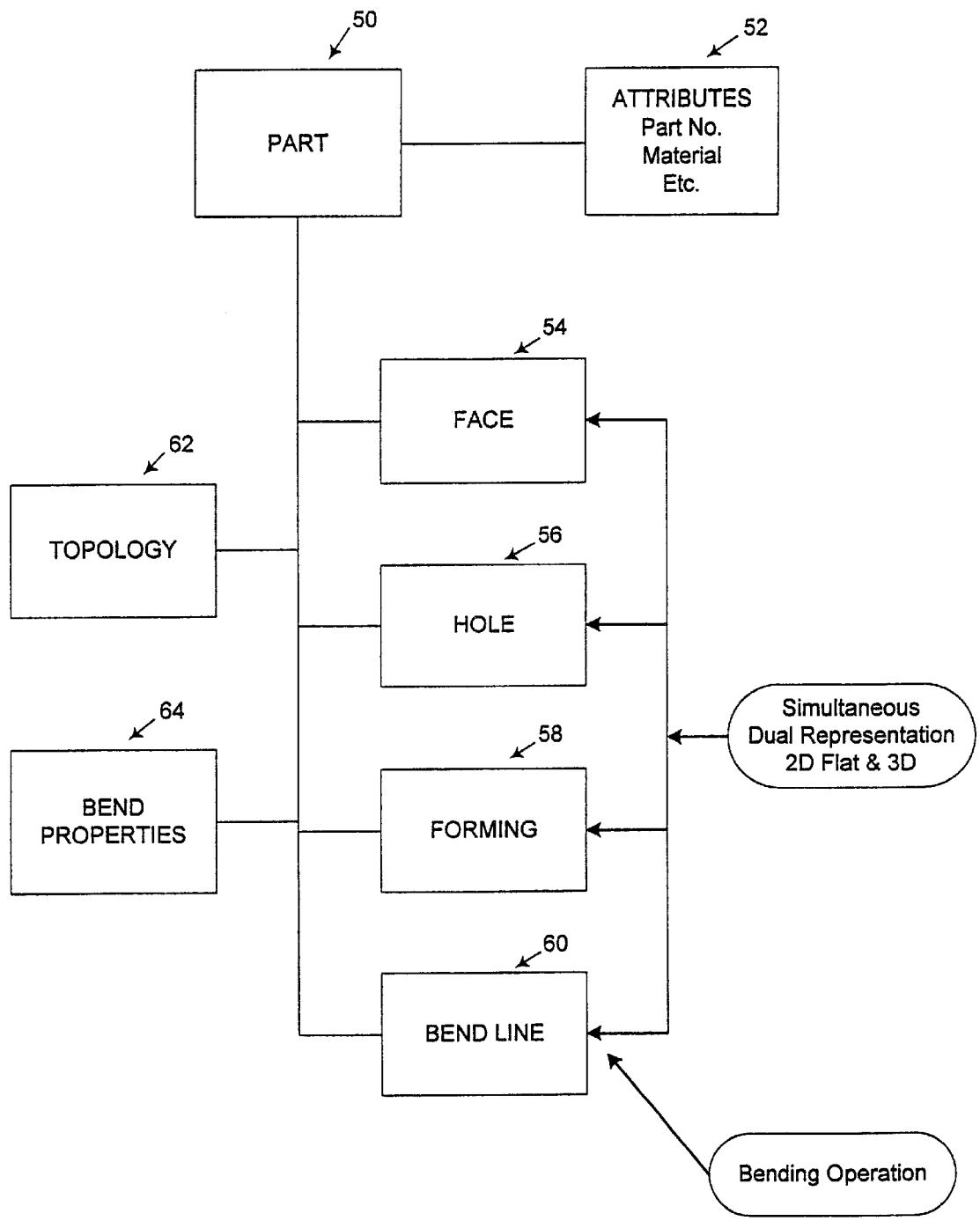
FIG. 2 illustrates an exemplary data structure and access algorithm of an object oriented bend model that may be utilized when implementing the various features and aspects of the invention.
Figure 3:
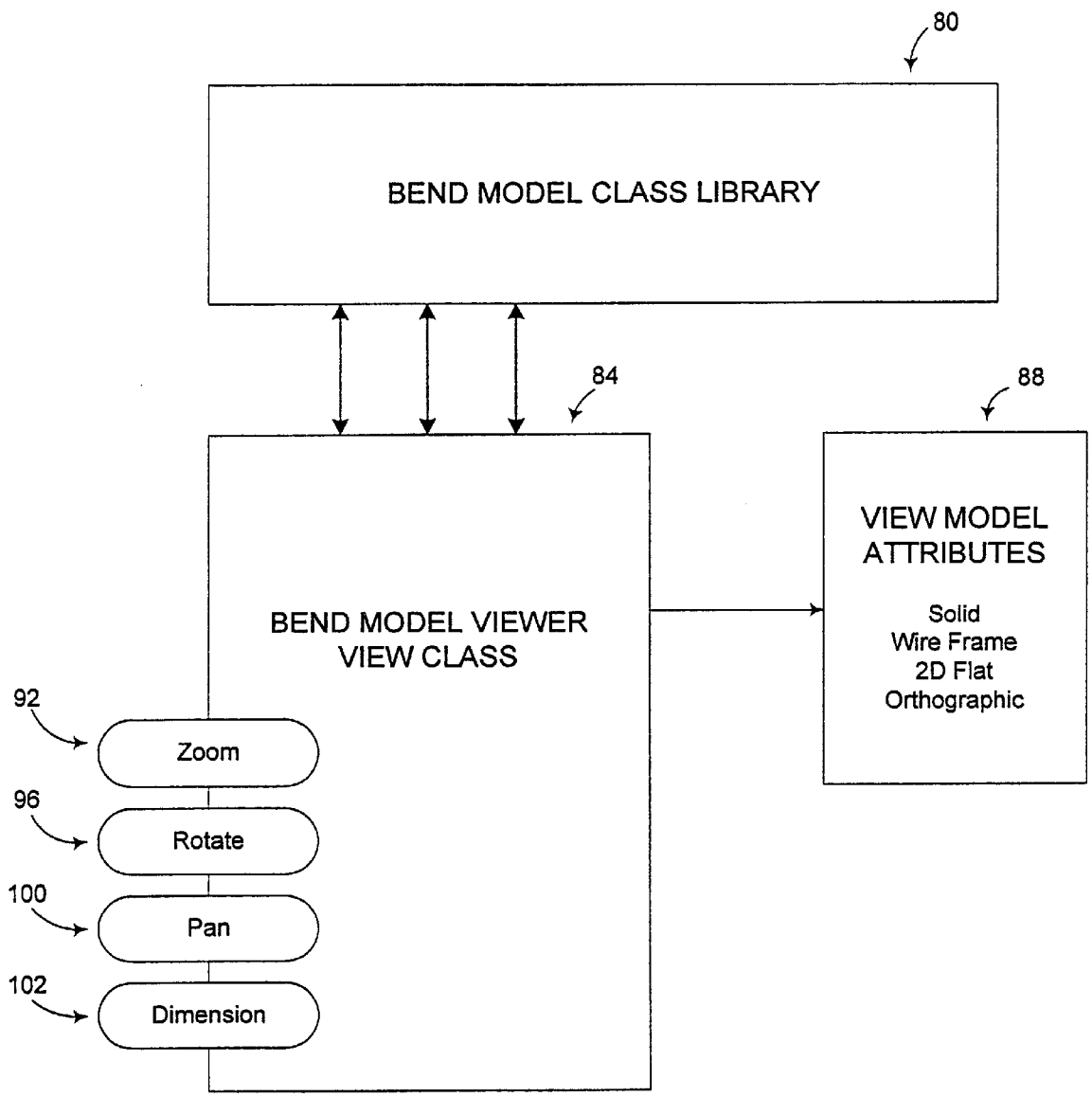
FIG. 3 illustrates a block diagram of an exemplary structure of a bend model viewer that may be provided with the object oriented bend model of FIG. 2.

Referring to FIG. 2, an exemplary data structure and access algorithm of the bend model that may be utilized in connection with the object oriented bend model system is illustrated. Object orient programming is a type or form of software development that can model the real world by combining objects or modules that contain data as well as instructions that work upon that data. In object orient programming, objects are software entities that may model something physically, like a sheet metal part, or they may model something virtual, like business transactions. Objects may contain one or more attributes (i.e., fields) that collectively define the state of the object, and may contain an entity that distinguishes it from all other objects. In addition, objects may include behavior that is defined by a set of methods (i.e., procedures) that can modify the attributes or perform operations on the object based on the existence of certain conditions.

In FIG. 2, the bend model for the sheet model part is illustrated as a completely self-contained class library. All of the required data manipulation and functions for the sheet metal part (e.g., folding, unfolding, etc.) may be captured as member functions of the class library. All of the geometrical and topological data may be defined in objects that are grouped within the bend model. The bend model class library may be a hierarchy of classes or objects with a part class being the top level class in the hierarchy. The part class may include a part object with various part attributes and may have various objects that define the part and the actions that may be performed on or to the part.

FIG. 2 shows an example of the various objects that may be grouped in the bend model class library. For example, a part class 50 may be provided that includes various attributes 52. The part attributes 52 may include various part information such as the part number and/or name, the part material type and the thickness of the part. The attributes 52 may also include bend sequence information for indicating the order in which the bends are to be performed and other manufacturing information such as tolerance requirements for the various dimensions of the part. Part class 50 may also comprise various objects, such as a faces object 54, a holes object 56, a formings object 58 and a bendlines object 60, as illustrated in FIG. 2. Each of the objects 54, 56, 58 and 60 may actually consist of a group of objects for each of the entities (e.g., faces, holes, formings, and bendlines) represented therein. The faces object 54, holes object 56, formings object 58 and bendlines object 60 may each include geometry and dimension data, location and coordinate data in both 2-D and 3-D space representations, and data relating to the edges and surfaces of their respective entities (e.g., faces, holes, formings and bendlines) of the part. For example, the faces object 54 may include geometry and dimension data for each of the faces, location space of the faces in both 2-D and 3-D representation and edges and surface data for the edges and surfaces of the faces. In addition, the formings object 58 may include data relating to special formings in the part, including geometry and dimension data, 2-D and 3-D location space data, and edges and/or surfaces data.

As further shown in the exemplary data model of FIG. 2, the part class 50 may also include a topology object 62 and a bend properties object 64. The topology object 62 may include the part topology data for the faces, holes, formings and bendlines of the part. The data in the topology object 62 may indicate the structure and geometric relationships of the various features of the part. The bend properties object 64 may also include information concerning special manufacturing constraints for one or more features of the part. For example, bend properties information concerning how the sheet metal part should be bent may be provided in the bend properties object 64. The bend properties information may include specific manufacturing data for different bend property types (e.g., simultaneous bend, collinear bend, Z-bend, etc.).

The bendlines object 60 may also include manufacturing specific data relating to the bends to be performed. Thus, in addition to providing geometry and dimension data, 2-D and 3-D location space data, and edges data for each bendline, the bendlines object 60 may also include V-width data, bend pitch data, bend count data, and/or orientation data for each of the bendlines. Each of the bendlines may also include an associated bending operation, as shown in FIG. 2. The bending operations may be implemented as a group of objects with data and operations/instructions for performing bends at each bendline. If provided as an object, each bending operation may include data and instructions indicating how and what type of bending is to be performed (e.g., conic bend, Z-bending, Hemming, arc bending, etc.), as well as pertinent bend data such as the bend angle, bend radius and/or bend deduction amount.

By implementing the bend model of the part through an object oriented data model, all the complex mathematical calculations, computational geometry and matrix transformations may be built into a single class library. Special bending operations, such as Hemming, Z-bending and arc bending, may also be captured inside the class library. Further, manufacturing information, such as the V-width, the bend deduction amount, and the bend sequence, may be also captured within the class library. With the bend model, simultaneous dual representation of both the 2-D flat model and the 3-D model may be effectuated, as illustrated in FIG. 2. Further, bending operations may be performed in accordance with the bendlines object 60 of the bend model.

In addition, as explained above, a bend model viewer may be provided to interpret the bend model and display visual images of the part in 2-D and/or 3-D space representation. FIG. 3 illustrates a block diagram of an exemplary structure of a bend model viewer and its relation to the bend model. The bend model viewer may be implemented through object oriented programming techniques and may be a Windows based application that permits users at the station modules of the various locations 10, 12, 14 . . . 20 in the facility 38 to display various views of the part based on the information provided in the bend model. The bend model viewer may comprise a set of application library modules that are used to visualize the sheet metal part. Further, the bend model viewer may be designed as a base view class of the Windows application so that it can be used as a base view class for any Windows application. Most of the standard operations to view the 2-D and 3-D models (e.g., zoom 92, rotate 96, pan 100, dimension 102, etc.) may be implemented as member functions of the bend model viewer. Geometric transformations and fundamental computer graphics techniques may be applied to the bend model objects when performing viewing operations. In addition, the bend model viewer may comprise view model attributes 88, that comprise, for example, four major view modes including a solid view, a wire frame view, a 2-D flat view and an orthographic view.

As illustrated in FIG. 3, the bend model class library 80 may include a set of procedures or functions that act upon sheet metal parts depending upon the selected view (e.g., solid, wire, 2-D flat or orthographic view). The bend model viewer view class 84 may comprise a series of standard operations, such as zoom 92, rotation 96, pan 100 and dimension 102. Depending upon the state of the bend model viewer, the bend model viewer view class may call functions from the bend model class library 80. As shown in FIG. 3, the various view model attributes or features 88 that may be selected by a user may include a solid view, a wire frame view, a 2-D flat view and an orthographic view. Fundamental computer graphics and geometric modeling techniques, such as geometric transformations and 3-D geometry techniques, may be utilized to implement the various features of the bend model viewer and to provide different viewing modes and functions. In addition, commercially available graphics libraries or packages may be utilized to provide the 2-D and 3-D modeling and simulation features. By way of a non-limiting example, the various features and aspects of the bend model and bend model viewer disclosed in U.S. patent application Ser. No. 08/690,671 may be utilized.

As discussed above, the present invention provides an interface for transferring and exchanging data related to a sheet metal part between a CAD program, such as a 2-D CAD program, and an object oriented bend model application (referred to as a bend model program herein). This interface may be implemented as a functional interface layer between the 2-D CAD program and the bend model program and define a set of application program interface (API) functions that allow a design programmer or user to create and manipulate the model of the part. The library of API functions may be implemented with software as part of the bend model program. The object oriented bend model of the part may be accessed using the interface or may be accessed directly using the API of the bend model program. The use of such an interface has several advantages, including the ability to accomplish complex tasks and editing through the use of just a few function calls.

In accordance with an aspect of the present invention, a communication channel is established between the 2-D CAD program and the bend model program in order to provide an interface. Establishing such a communication channel between the CAD program and the bend model program depends primarily on whether the CAD program and the bend model program are established as separate processes or applications. For example, when the programs are separate processes, a communication channel or path should be established through the use of inter-process communication. This may be done by using a message protocol or message-based system such as Dynamic Data Exchange (DDE). If, however, the interface is implemented as part of the bend model program and the bend model program is directly linked with the 2-D CAD program, then the 2-D CAD program can directly access the bend model and there is no need for a special communication protocol between the CAD program and the bend model program.

DDE always occurs between a client application and a server application. During transfers of data, both the 2-D CAD program and the bend model program can act as either a client application or a server application. The DDE client application starts the conversation or exchange, and the DDE server application responds to the client application. The client application may initiate the exchange by establishing a conversation with the server to send transactions to the server application. A transaction may include a request for data or services. The server application responds to transactions by providing data or services to the client.

As explained above, the 2-D CAD program and the bend model program may be provided as separate processes. In such a case, these programs may exist on the same workstation or platform (such as at design station 10 in FIG. 1) or they may exist on different platforms or computer stations and communicate through a network connection (such as design station 10 and server module 32 which communicate by communications network 26 in FIG. 1). If the applications are provided as separate processes on the same workstation or computer platform, then an operating system which permits multi-tasking such as Windows NT which is available from Microsoft Corp., may be provided to permit both applications to simultaneously operate.

The interface may be implemented through the use of a static library of API functions or may be implemented as a dynamic link library. The library of functions may be programmed using a high-level programming language, such as C++ and may be implemented as part of the bend model program. Each application (i.e., the 2-D CAD program and the bend model program) should be linked or include the same library of functions. If both programs are provided as Windows-based applications, DDE may be utilized as a message protocol to facilitate the exchange of sheet metal part data. If a conventional CAD program is utilized for the 2-D CAD system, then the conventional CAD program should be modified with DDE and access to the library functions.

The CAD program and the bend model program may be implemented as Windows based applications. In order to add DDE capability to a Windows application, the dynamic data exchange management library (DDEML) may be utilized to provide an application programming interface. Functions provided by the DDEML may be utilized by the CAD program or bend model program to manage DDE conversations. The DDEML also provides a function that enables a server application to register the service names it supports. The service names are then broadcast to other applications in the system, which use the names to connect to the server. To use the API elements of the DDEML, a DDEML.H header file should be included in the source files, a USER32.LIB file should be linked to the system and a DDEML.DLL file should reside in the system's path.

As discussed above, the interface of the present invention may be implemented through a set of API functions that allow the user to create and manipulate a bend model part. Preferably, the set of API functions are provided in the form of a static library that is accessible by both the 2-D CAD program and the object oriented bend model program. With a defined set of API functions, a bi-directional interface may be created to facilitate the exchange of data between both programs. When the 2-D CAD program acts as the client application, it initiates the transaction and the bend model program acts as the server application by responding to the transaction. Similarly, the bend model program may act as the client application when it initiates a transaction and the 2-D CAD program serves as the server application when responding to the transaction request. In this way, data may be passed between the 2-D CAD program and the bend model program over a bi-directional interface.

The API functions which are defined for the communication library of the interface may be selected based on the types of data and transactions that are required. For handling data related to a sheet metal part, these API functions may include functions to handle data representing the faces and edges of the part. Other API functions may also be included for initializing the interface and transferring other types of data. Table 1 contains a list of exemplary API functions that may be included in the bend model-CAD (BMCAD) interface to facilitate the transfer of data between the 2-D CAD program and the bend model program. In Table 1, the name of each API function is provided along with its associated purpose or function. Additional API functions may be provided in addition to that indicated in Table 1 and/or other combinations or subcombinations of the API functions indicated in Table 1 may be provided according to the type of applications or processes involved.

TABLE 1

API FUNCTIONS

| API FUNCTION NAME | PURPOSE |
| --- | --- |
| Initialize_BMCAD_Interface | Initialize the BMCAD Interface |
| Terminate_BMCAD_Interface | Terminate the BMCAD Interface |
| Initialize_Part | Initialize a part and set basic parameter values |
| Close_Part | Close a part and erase all of its contents |
| Save_Part | Save a part in a defined file format |
| Load_Part | Load a part from a defined file format |
| Add_Face | Create a face from basic flange data and add face to the part |
| Delete_Face | Delete a face from the part |
| Update_Face | Update an edited face which was sent earlier |
| Attach_Faces | Attach two faces and create bendline(s) |
| Delete_Bendline | Delete all bendlines between two defined faces |
| Set_Bending_Parameters | Set new bending parameters for a bendline |
| Shift_Face | Move one face with respect to another face |
| Auto_Detect_Collinear_Bendlines | Automatically detect collinear bendlines |
| Add_View | Send 2-D view of part to 2-D CAD |
| Close_Part | Close part without erasing file |
| Set_View_Update_Mode | Send ON or OFF mode for the view update mode |
| Set_Fold_Mode | Send a FOLD or UNFOLD mode of transmission |
| Set_Base_Face | Set a base face for the part |
| Send_Flat | Send a flat version of the part |
| Send_Folded | Send a folded version of the part |
| Send_Faces | Send a version of the part as a collection of faces |

The API functions of the interface, such as those indicated Table 1, should be implemented on both the server and the client side. As discussed above, if two applications are talking to each other, either of the applications could be working as a client or as a server application. Accordingly, each application needs to implement a function for sending as well as for receiving the same data. Accordingly, according to an aspect of the present invention, each API function in the interface should be provided in two versions with the identical set of parameters. For example, for the Add_Face function, an Add_Face_Send and an Add_Face_Receive would be provided. In addition, while each application (i.e., a 2-D CAD program or a bend model program) will need to implement the functions differently, their parameters are common for each function such that all of the applications would use the same include files and the same client/server protocol library.

If any of the API functions are used with the purpose to send the edge geometry data of a part to the 2-D CAD program for editing and subsequent update to the bend model part, then two general requirements should be observed and maintained. First, the names of updated geometry should be the same as the original names or a table of correspondence between the old and new names should be maintained. In addition, attributes of updated geometry should be the same as the original attributes or the new or revised attributes should be communicated back to the bend model program. As editing is performed on the sheet metal part in the 2-D CAD program environment, the face geometry data can be returned to the bend model program so that the face and other features of the part can be updated. This permits an operator to then view the modified or revised part in either 2-D or 3-D in the bend model program application environment.

In order to facilitate a better understanding of the various features and aspects of the invention, a detailed description of each of the API functions represented in Table 1 will now be provided. Once again, it is noted that these API functions are exemplary and that other combinations or subcombinations of API functions may be provided.

The communication library for the interface of the present invention should include API functions for initializing and terminating the interface. For this purpose, as indicated above in Table 1, an Initialize_BMCAD_Interface and a Terminate_BMCAD_Interface function are provided. The purpose of the Initialize_BMCAD_Interface is to initialize the interface with respect to both the client application and server application which, as noted above, may include the 2-D CAD program or the bend model program. For the server application, the initialize function will be called so that the application may identify itself and register as a server application with the interface. Calling the initialize function also opens a communication channel to the server application. For the client version, calling the Initialize_BMCAD_Interface function may initialize the dynamic data exchange management library (DDEML). In addition, the Terminate_BMCAD_Interface function may be called by the client or server to terminate the interface. When terminating the interface, various flags, marking the end of the session, could be set for internal purposes on either the server or client side.

Figure 4A:
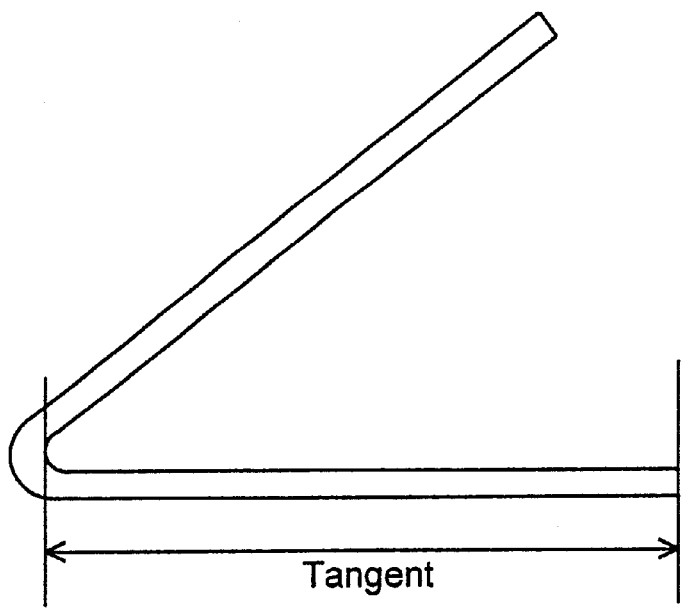
FIGS. 4A and 4B include illustrations for explaining basic parameter values that may be set for a part, including parameter value(s) for defining an acute angle approximation mode of the part as being one of a tangent or intersection mode.
Figure 4B:
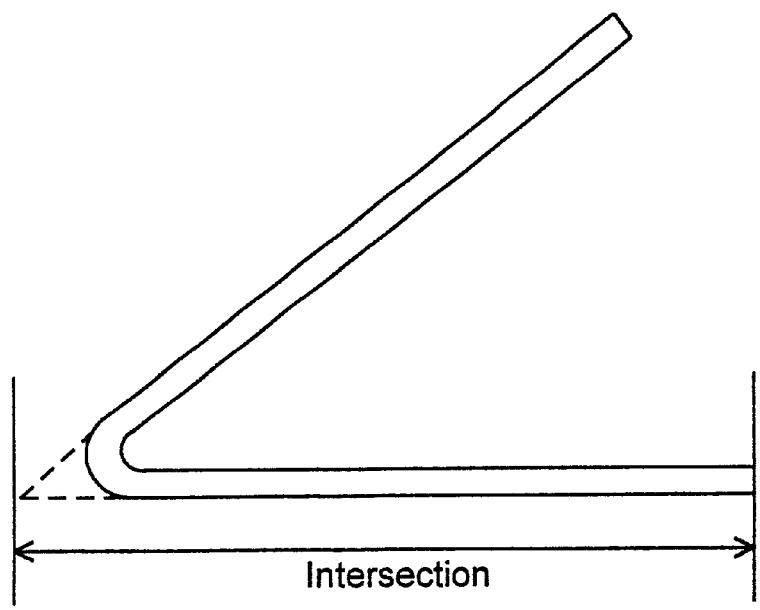
Figure 5A:
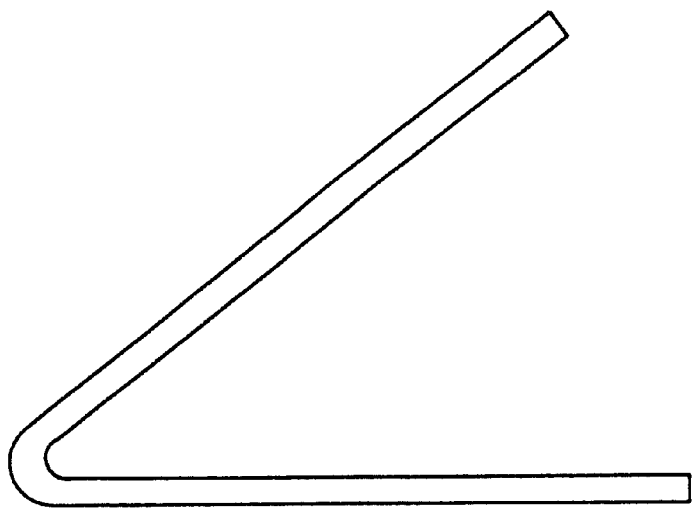
FIGS. 5A and 5B are further illustrations for facilitating the description of basic parameter values that may be defined for a part, including a modeling mode of the part as being a realistic or conceptual modeling mode.
Figure 5B:
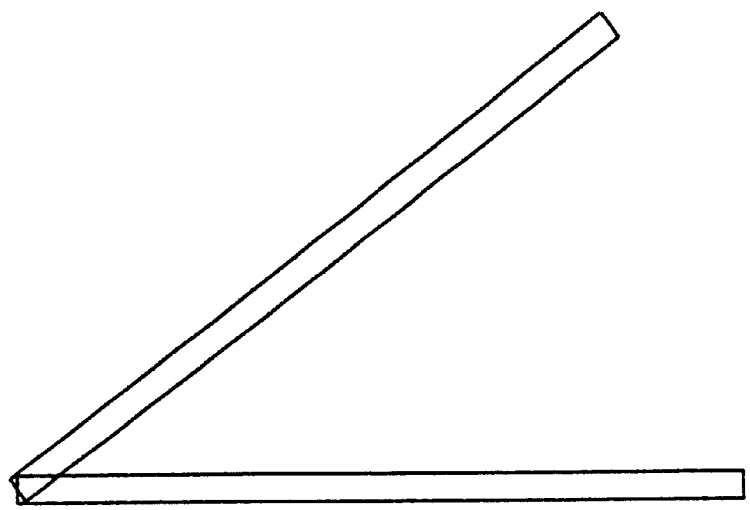

An API function may also be provided to set up or initialize a part and to set basic parameter values relating to a part. For example, as indicated in Table 1, an Initialize_Part function may be provided to define a part name for a part and to set basic parameter values. When sending data relating to a part, the part name should be indicated so that the data will be properly handled by the client and server applications. For this reason, the part name selected by a user or operator should be unique so that each particular part and its associated data may be referred to by name. The part name may be a numeric based name. In addition, to providing the part name as input for the Initialize_Part function, other input may also be provided to set and define basic part parameter values. For example, a metal thickness value may be provided to define the thickness of the metal of the sheet metal part. In addition, other parameters may be provided as input to indicate the manner in which acute angles of the part are to be measured and the manner in which the part is to be modeled or represented. For example, a user may define an acute angle approximation mode so as to define the acute angle approximation as being in either a tangent or intersection mode. In this regard, FIGS. 4A and 4B illustrate exemplary sheet metal parts and the manner in which acute angle approximation would be carried out in a tangent mode and in an intersection mode. The modeling mode of the part may also be defined by the user. For example, as shown in FIGS. 5A and 5B, a realistic or conceptual type of a modeling mode may be indicated by the user to set the mode by which the part is to be modeled and represented. Other basic parameter values of the part may also be defined and initialized by the user, including for example the dimension type (e.g., inches, millimeters, etc.) for the sheet metal data.

Other API functions may be provided for closing a part without saving its contents and for saving or loading a part from a data file. For example, a Close_Part function may be provided for the purpose of deleting or closing a part identified by a part name that is provided as input. When the Close_Part function is called, the document that contains the part will be closed without saving the part to a file. If a bend model viewer, such as that described above with respect to FIG. 3 is also provided, then the viewer associated with the part may also be deleted. If a user wishes to save a part to a particular file, then a Save_Part function may be provided to enable a user to save a part in a file. Input to the Save_Part function should include the part name and the file name to which the data relating to the part (as identified by the part name) is to be saved. The file name should be a full path name with the proper extension (e.g., ".BMF"). To provide extra flexibility, a user may be given the option to save the part in one of several file formats such as BMF, PGF, etc. In such a case, the user should provide the appropriate extension to indicate the type of file format that is requested. A Load_Part function may also be included in the library to permit the loading of a part from a file. The input to the Load_Part function should include the file name of the file containing the part data as well as the part name which will be assigned to the part after it has been loaded. Once again, the part name should be unique so that the part may be later referred to by the user. In addition, the file name should include the full path name with the extension (e.g., ".BMF" or another appropriate format) so that the file may be properly loaded at the client or version side.

As indicated in Table 1, various API functions may also be provided to facilitate the editing and modification of the faces of a part. Such API functions include an Add_Face function, a Delete_Face function, an Update_Face function, and an Attach_Faces function. In accordance with an aspect of the present invention, individual face data of a part may be transferred and edited using the interface between the 2-D CAD program and the object oriented bend model program. A face may be defined from basic flange data given, for example, as a set of loops of edges. That is, a face may be defined from a list of loops, each of which is a list of edges. An edge may comprise various types, including a line, an arc or a circle. A unique name should be provided for each face of a part. In addition, a user should also define and assign a unique name for each edge of a face.

The edge name should be unique within the part, so that each edge can be referred to later when, for example, attaching two faces. Since it is generally difficult to edit the faces of a part within a 3-D CAD environment, the modification of the faces of an existing part or the creation of faces for a new part should preferably be performed within a 2-D CAD environment. Accordingly, the above-noted API functions may be utilized for passing face data from the bend model program to the 2-D CAD program to perform 2-D based editing of the faces. Modifications to the face data may then be transferred via the interface to the bend model program to update the 2-D and 3-D representations of the part in the object oriented bend model.

Figure 6A:
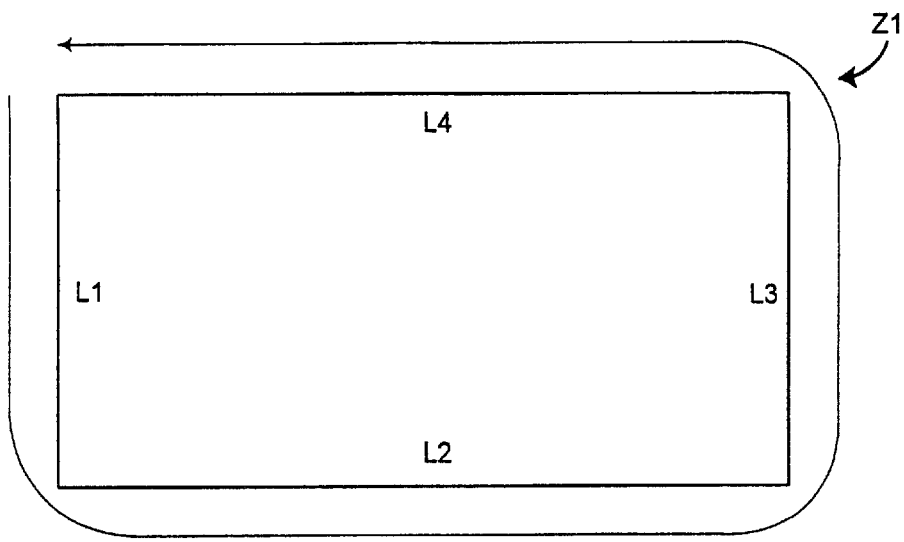
FIGS. 6A and 6B are illustrations of exemplary sheet metal parts and their associated bounding loops and/or loop holes.
Figure 6B:
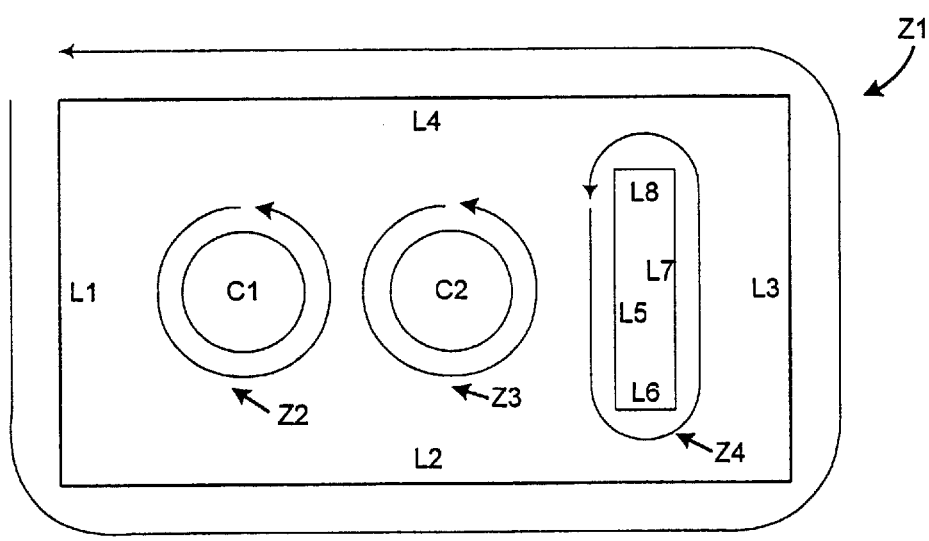

A face of a sheet metal part may be represented by a collection or list of loops, each of which is a list of edges. For a simple rectangular or square face without any openings, a single bounding loop may be used to define the face. For example, FIG. 6A illustrates an exemplary face of a part that is defined by a single bounding loop Z1 that consists of line edges L1, L2, L3 and L4. Each face within a part may be defined by a bounding loop. For each face of a sheet metal part having various openings, a list or set of loops may be utilized to define the face. For example, FIG. 6B illustrates an exemplary face of a sheet metal part with two hole openings and a rectangular opening. For the exemplary face of FIG. 6B, the face would be defined by the bounding loop Z1 and inside loops Z2, Z3, and Z4. Bounding loop Z1 would include line edges L1, L2, L3 and L4, and inside loops Z2, Z3 and Z4 would define the openings provided in the sheet metal part. Inside loop Z2 would include circle edge C1, inside loop Z3 would include circle edge C2, and inside loop Z4 would include line edges L5, L6, L7 and L8.

In order to pass face data as a collection of loops of edges, a predetermined format may be utilized to store and transfer the face data. In addition, a predetermined format may be utilized for storing and sending all of the face data associated with a part. FIGS. 7A and 7B illustrate exemplary data structures and arrangements for storing and sending the face data associated with a part.

In particular, FIG. 7A illustrates the structure of a buffer for storing all the face data associated with a part. The face data format of FIG. 7A may be utilized when sending the part data as a collection of attached faces with the Send_Faces function (described in greater detail below). As shown in FIG. 7A, the buffer may include various fields for storing various parameter information including: the length of the contents of the buffer; the number of faces (N) of the part; each face name for the N faces of the part; and the face data for each of the N faces of the part. The length of the fields indicating the length of the buffer and the number of faces N may be long, such as 4 bytes each. The length of the face name may also be long and, therefore, the field containing the face names for the N faces may be N×4 bytes in length. Further, the fields containing the face data may be set according to a predetermined face format for each set of face data; and, therefore, the fields containing the face data should be N×face format in length. In this regard, it is noted that the length of the faces data does not include the 4 bytes taken by the length of the value itself. An exemplary data structure and arrangement for the face format for each face is illustrated in FIG. 7B.

FIG. 7B illustrates an exemplary data structure and related buffer for containing the face data. The face data format of FIG. 7B may be utilized when sending face data for a single face of the part with, for example, the Add_Face function (described in more detail below). As illustrated in FIG. 7B, the face format of the buffer may include various fields for defining or storing different parameters, including: the length of the contents of the buffer; the number of hole-loops (H) in the face; the bounding loop of the face; and data defining each of the H hole-loops of the face. The length of the field defining the length of the buffer and the length of the field defining the number of hole-loops may be long, such as 4 bytes in length. Further, the data defining the bounding loop of the face may have a length that is set in accordance with a predetermined loop format for storing the bounding loop data. The predetermined loop format may also be used for defining each of the hole-loops of the face. As a result, the field containing the H hole-loops may have a length that is set to H×loop format. While a face of the part may have no holes (i.e., 0 hole-loops), each face should at least have a bounding loop. Further, it is noted that the length of the face buffer does not include the 4 bytes taken by the length value itself.

Figure 8A:
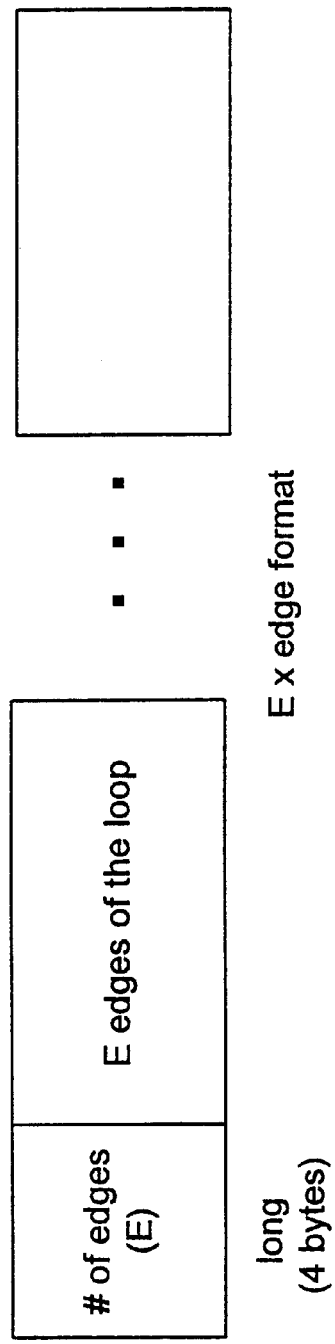
FIGS. 8A and 8B illustrate exemplary data structures for loop format and edge format data to define the various loops and edges associated with each face of a part.

FIG. 8A illustrates an exemplary arrangement for the loop format that may be used to define the bounding loop and the each of the hole-loops of a face. As shown in FIG. 8A, the buffer containing each loop may comprise fields for defining or storing the following parameters: the number of edges (E) in the loop; and data defining each of the E edges in the loop. The field of the loop format defining the number of edges in the loop may be long, such as 4 bytes in length. In addition, the fields defining each of the E edges of the loop may have a length that corresponds to the formatting of the edge data and, therefore, may have a total length of E×edge format. When storing the edge data, the edges of the loop do not have to be sorted and the direction of each edge (i.e., the order of its start-end points) does not need to be identified. If gaps exist in a loop, then they may be filled with straight lines.

Figure 8B:
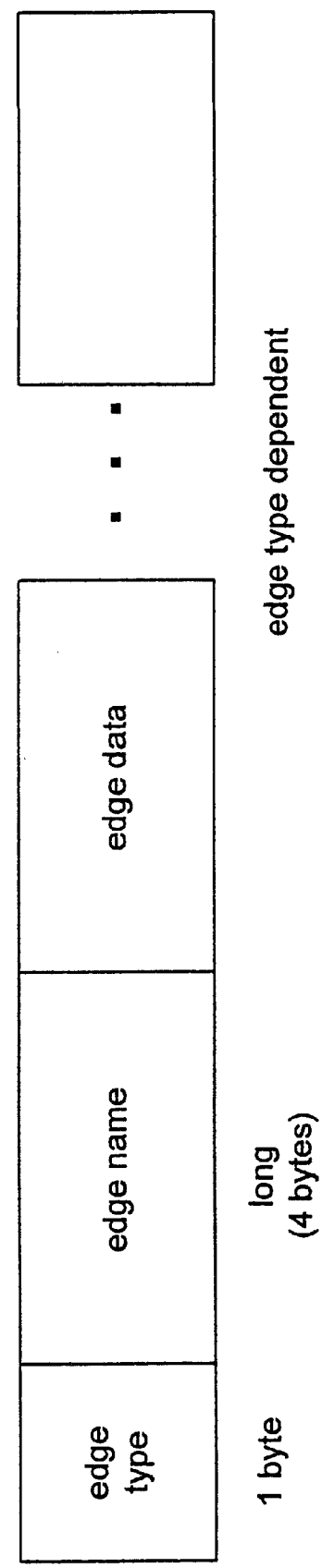

The data defining the edges in the loop format may be stored according to a predetermined edge format. FIG. 8B illustrates exemplary data structure and arrangement for storing the edge-related data. As illustrated in FIG. 8B, the edge format may include various fields for defining or storing data related to the edge, including: an edge type; the name of the edge; and the data defining the edge depending on the edge type. The field defining the edge type may be one byte in length and be utilized to define the type of edge that is present (i.e., line, arc, or circle). Different type characters may be utilized to define each edge type. For example, the following scheme may be used: line—type character 1; arc—type character 2; and circle—type character 3. Additional edge types may also be defined, such as attribute data—type character 0 or centerpoint—type character 4. The field defining the edge name in the edge format may be long, such as 4 bytes in length and should be assigned by the user and be unique within the part. The edge names can be later used to refer to particular edges of a face.

The edge data that is provided in each edge buffer may be structured according to the type of edge data that is present. Table 2 lists the data that may be included for each edge type and the length or size of each edge type data (indicated by parenthesis in Table 2). Of course, different sets of data may be provided according to the type of edges that are present and, therefore, Table 2 may be modified according to the application of the invention.

TABLE 2

EDGE DATA

| EDGE TYPE | DATA (Size) |
| --- | --- |
| Line | Start-point of the line (3x8 bytes) |
| Arc | Center-point of the arc (3x8 bytes) |
| Circle | Center-point of the circle (3x8 bytes) |
| Center Point | Center-point of the hole-loop (3x8 bytes) |
| Attribute | Length of attribute data (4 bytes) |

As discussed above, the edge data may include attribute data which defines various attributes relating to the edge of the face. The attribute data may be stored in a buffer in accordance with a predetermined attribute data format. The format may be set according to the type of attribute data that is provided. For a sheet metal part, the attribute data for an edge may include bendline data. The bendline data may define or set various bending parameters for an edge, including the bending angle, the inside radius of the bend angle, the bend deduction amount and the dimension of the bendline. Other types of attribute data may also be included for each edge such as relief hole attribute data, relief slot attribute data, corner attribute data, set back attribute data, face trim attribute data, and dimension attribute data.

Referring again to Table 1, various API functions may be provided for editing and modifying face data. For example, as noted above, an Add_Face function may be provided to create and add a face to a sheet metal part. This function may be utilized by an operator to add a face to an existing object oriented bend model part through use of the editing tools of, for example, the 2-D CAD program. The input to the Add_Face function includes the part name, the name of the face, and a buffer containing face data. The buffer containing the face data may be formatted in a similar manner to that discussed above with reference to FIG. 7B. That is, face data may include a set of loops, wherein each loop is a list of edges. By using the Add_Face function, a face can be added to a bend model part. However, using the Add_Face function only causes the face data to be transferred and associated with the part, and does not attach the face to any edge of the part. Therefore, a separate API function should be provided to enable the added face data to be attached to another face of the part. An API function which performs this attach process is the Attach_Faces function, which is described in further detail below.

Figure 9A:
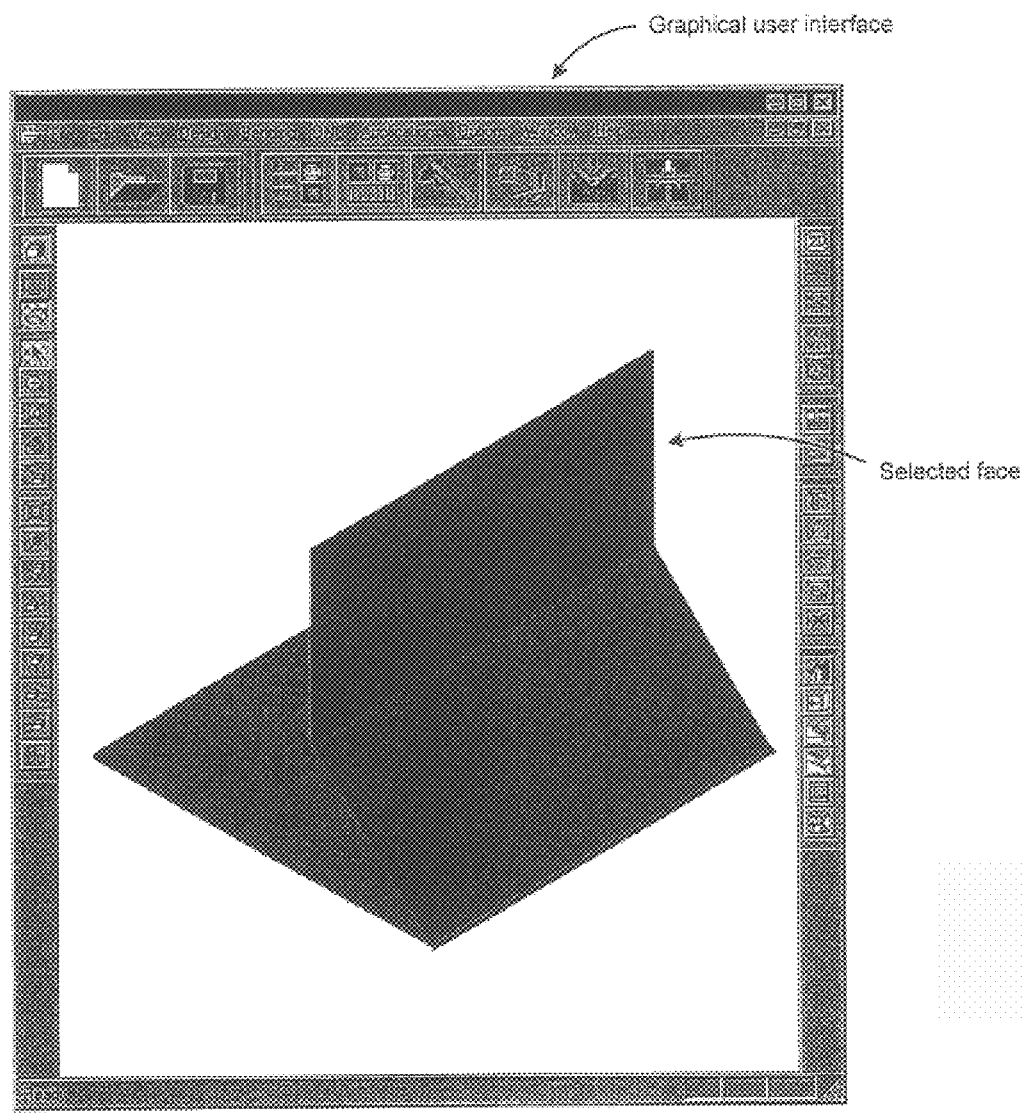
FIGS. 9A and 9B are illustrations of exemplary graphical user interfaces and display screens that may be provided to a user when deleting a face of a part.
Figure 9B:
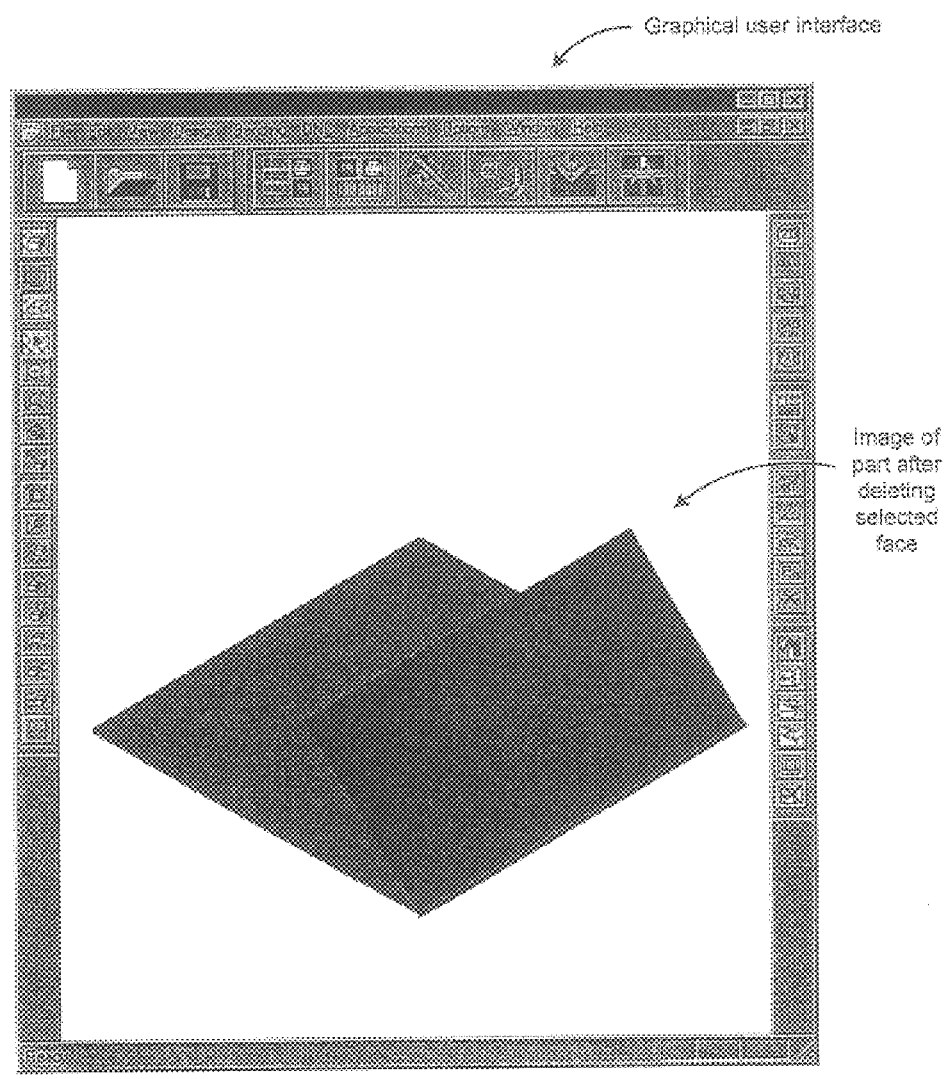

In addition to adding a face to the part, an operator may wish to delete a particular face from the part. For this purpose, a Delete_Face function is provided to permit a user to delete a face from the part. The input to the Delete_Face function includes the part name and the name of the face that is to be deleted. Once again, each face of the part should be assigned a unique name so that it may be referred to by the user. In order to facilitate the selection of a face to be deleted from the part, various graphical user interfaces may be provided in the 2-D CAD program and/or the bend model program. These graphical user interfaces may permit a user or design programmer to select a particular face by navigating a pointer on a display screen with a mouse device and selecting a face of the part that is represented in 2-D or 3-D on the display screen. FIGS. 9A and 9B illustrate exemplary display screens that may be provided to a user when selecting and deleting a face of a part.

As shown in FIG. 9A, a graphical user interface may be provided that includes a region for displaying a graphic representation of the part. With the use of an input device (such as a keyboard or mouse device), a user may select a face of the part that is to be deleted. As shown in FIG. 9A, once a face is selected, the selected face may be highlighted or shaded with a different color to indicate that it has been selected. After providing the selected face as input to the Delete_Face function, data may be transferred so that the face is deleted and the part model later updated. The resultant part may then be redisplayed to the user, as shown for example in FIG. 9B. When deleting the face from a part, all bendlines adjacent to the face will also be deleted. Bendlines may exist at one or more edges of the face to be deleted and, therefore, the edges may be checked to determine which bendlines are to be deleted.

Figure 10A:
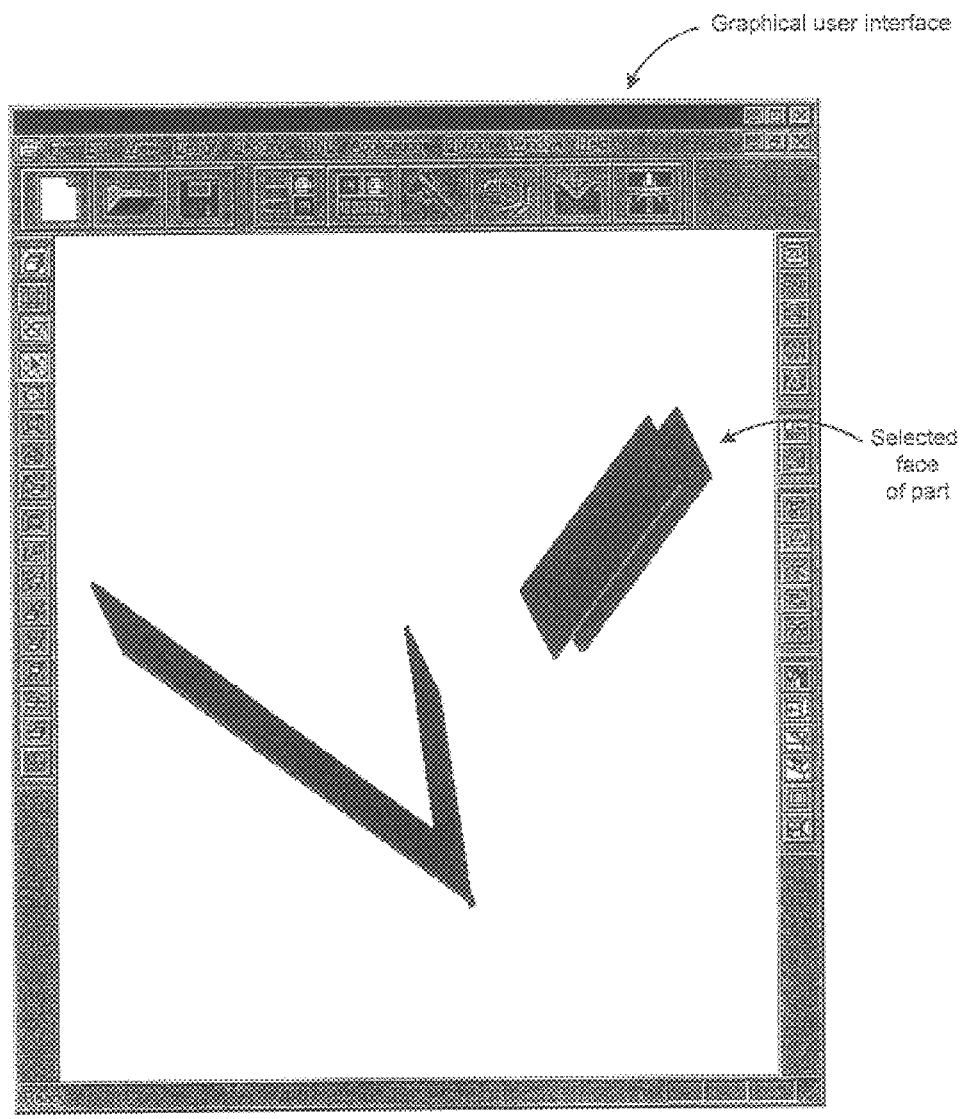
FIGS. 10A and 10B are illustrations of exemplary graphical user interfaces and display screens that may be provided when selecting and adding faces to a part.
Figure 10B:
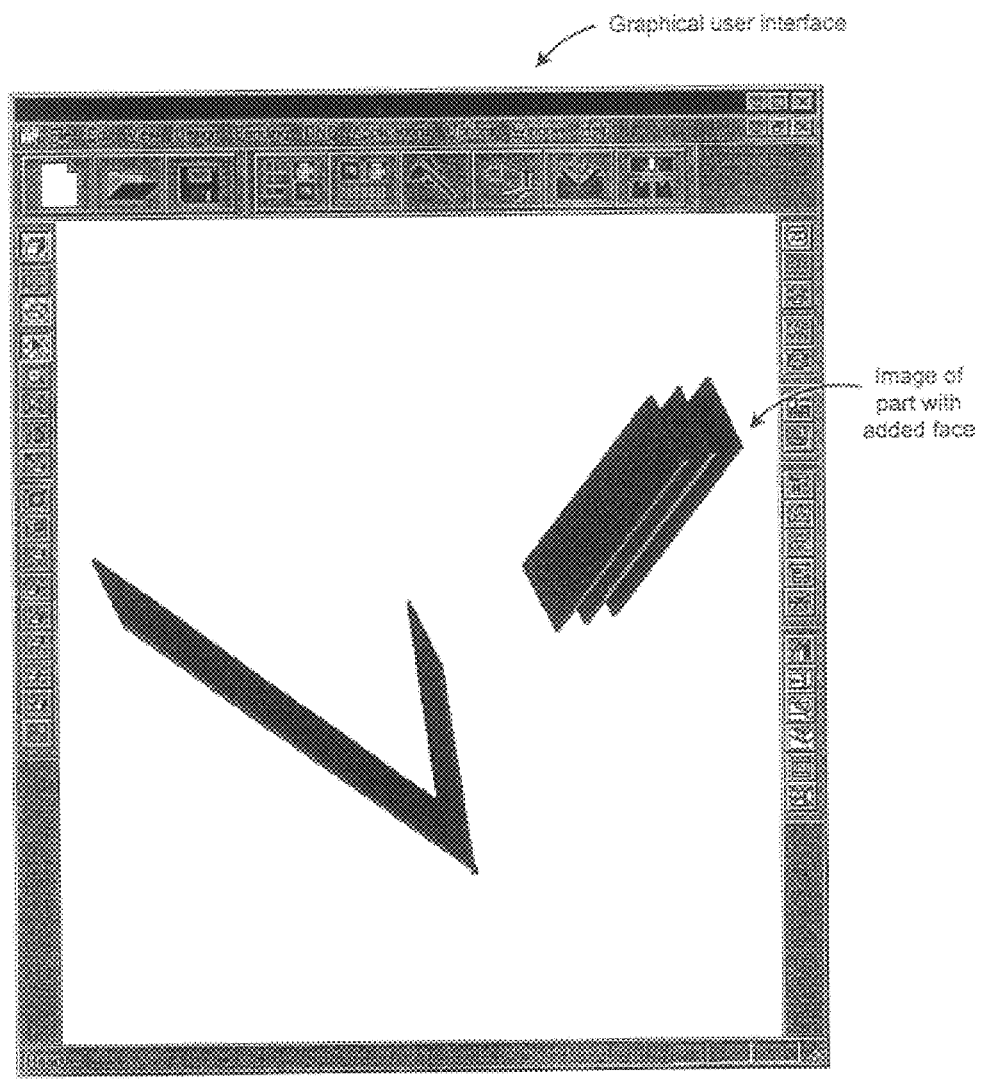

In addition to providing a graphical user interface for facilitating the deletion of faces, a graphical user interface may also be provided to facilitate the adding of faces to a part with the Add_Face function. For example, FIGS. 10A and 10B illustrate exemplary user interfaces and display screens that may be provided to a user when selecting and adding faces to a part. While editing tools provided in the 2-D CAD program may be utilized to define a face to be added to the part, it is also possible to provide editing features within the bend model program to permit a user to add new faces based on an existing face in the sheet metal part. That is, by selecting an existing face in the part, a duplicate face with similar dimensions may be added to the part using the Add_Face function. For example, as shown in FIG. 10A, by selecting one of the faces of the part (either an attached or unattached face), a face may be defined and provided as input to the Add_Face function so that the face may be added to the part. For example, assuming that one of the two unattached faces is selected by a user with a keyboard or mouse device, the flange data may be used to define a new face that is to be added to the part, as shown in FIG. 10B.

In addition to adding or deleting a face to the part, it may also be necessary to update the object orient bend model of the part with an edited or modified face. For example, by using the editing tools of the 2-D CAD system, the dimensions or holes of a face may be modified and the resultant edited face may need to be sent back and applied to the bend model part. In such a case, an Update_Face function may be provided to pass the edited face data back to the bend model program to update the bend model part. The input to the Update_Face function is similar to that for the Add_Face function. That is, the input to the Update_Face function should include the part name, the name of the face that is to be updated, and a buffer containing the revised or edited face data. The format of the face data may be similar to that described above with reference to FIGS. 7 and 8.

In accordance with another aspect of the present invention, an update face function may be implemented in the bend model program to handle updates to the bend model part. That is, when the Update_Face function is called by the 2-D CAD program, the bend model program may check to see if the specified face name is in the bend model. If the face name is existing, then the stored face data is deleted and the new face data is stored in place of the old face data and attached to the part. Once again, a unique face name should be assigned to each face of the part in order to avoid erroneous handling of the face data or modifications to the sheet metal part.

As shown in Table 1, API functions may also be provided in the interface library to facilitate the editing of bendlines and bending parameters for the sheet metal part. For example, a Set_Bending Parameters function may be provided to permit the bending parameters for any bendline in the part to be changed or altered. The bendline may be defined by specifying two faces of the part between which the bendline lies. This may be performed by specifying an edge in each of the faces. If bending parameters of one bendline are being changed, then all bendlines known to be simultaneous with that bendline may also be changed exactly in the same way. However, if a bendline is only collinear and not simultaneous with the selected bendline, then the bending parameters for that bendline will not be changed.

For each bending parameter, a special flag may be used to indicate that the current value should not be changed. The bending parameters that may be set with the Set_Bending_Parameters function may include: the bend angle; the bend type (front/back); the bend deduction amount; the inside radius of the bend; and the flange dimensions of the bendline with respect to the first face and the second face specifying the bendline. Accordingly, the input that should be provided to the Set_Bending_Parameters function should include the part name, the name of the first adjacent face, the name of the second adjacent face, and the bending parameter values (i.e., the bend angle, the bend type, the bend deduction amount, the inside radius amount, etc.). The data provided as input to the Set_Bending_Parameters may be set in a buffer accordance with a predetermined format. Such a buffer may include fields for defining or storing the following data: the number of parameters (P) being specified; and data for each of the P bending parameters. The length of the field defining the number of parameters P may be long, such as 4 bytes in length. The data for each of the specified bending parameters should include the identification numbers or IDs for each of the adjacent flanges or faces, and may be set based on the data structure or arrangement described below with reference to FIG. 20D and Table 3.

Figure 11A:
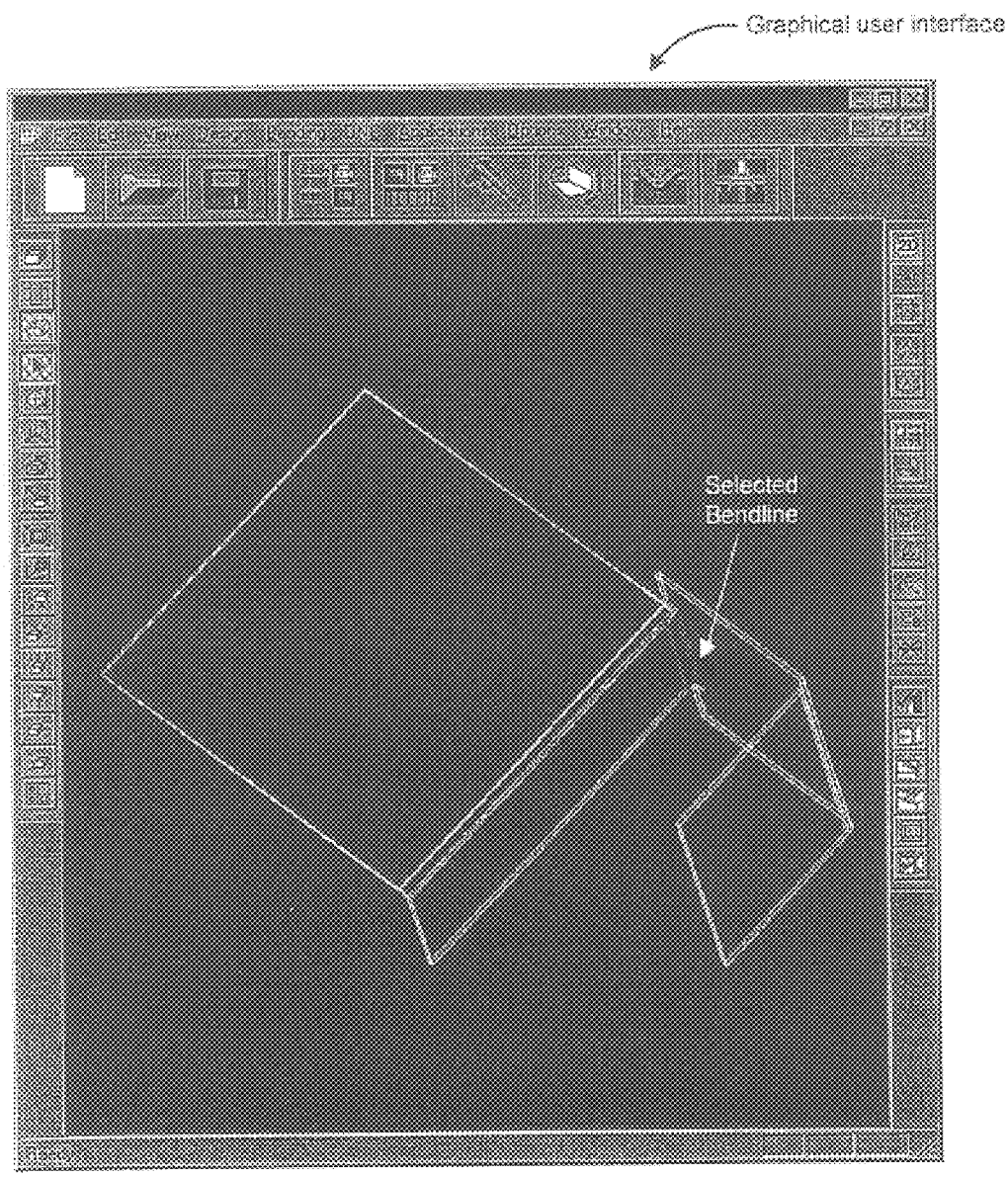
FIGS. 11A, 11B and 11C are illustrations of exemplary graphical user interfaces and display screens that may be provided when selecting a bendline of a part and modifying the bending parameters associated with the selected bendline of the part.
Figure 11B:
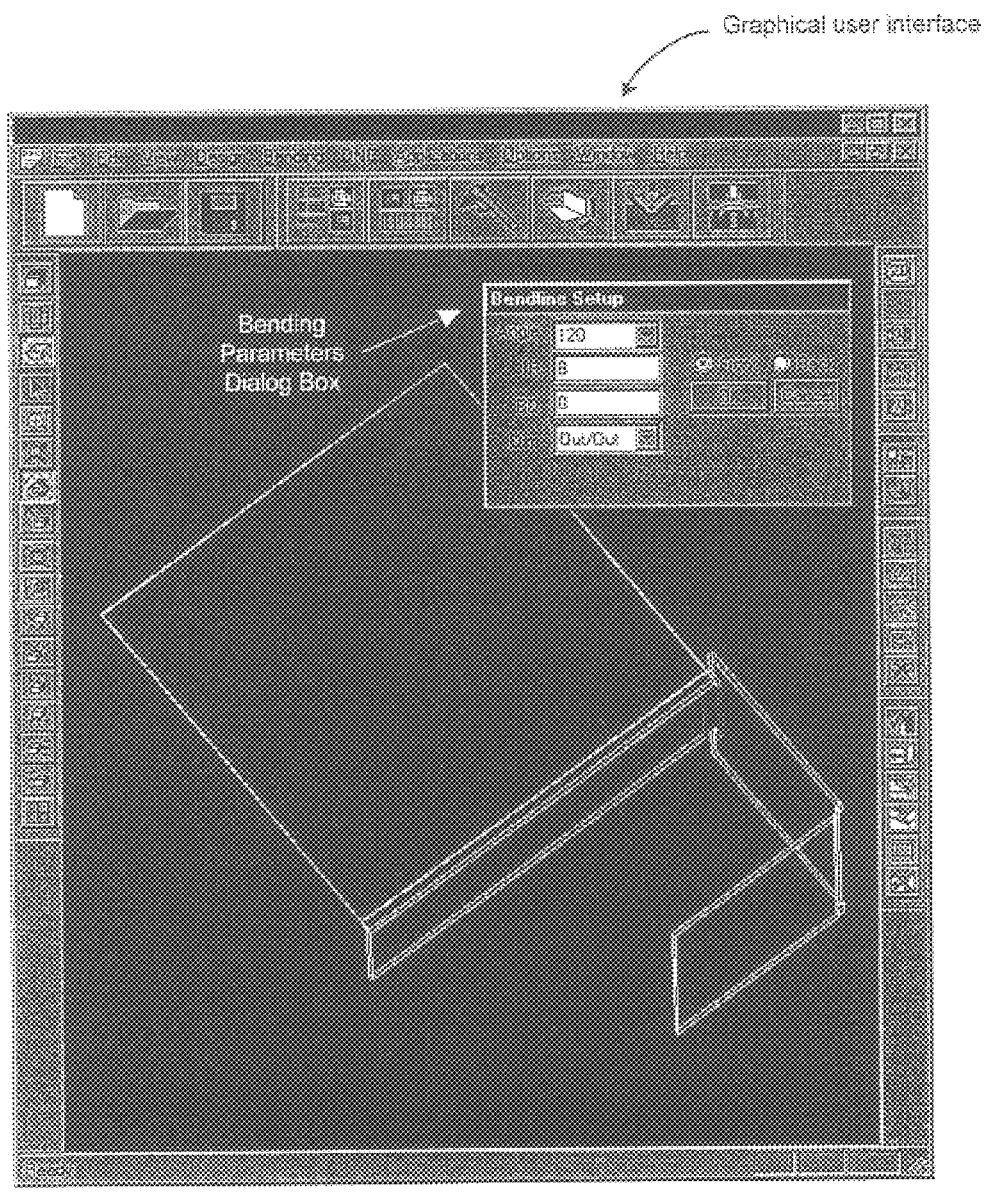
Figure 11C:
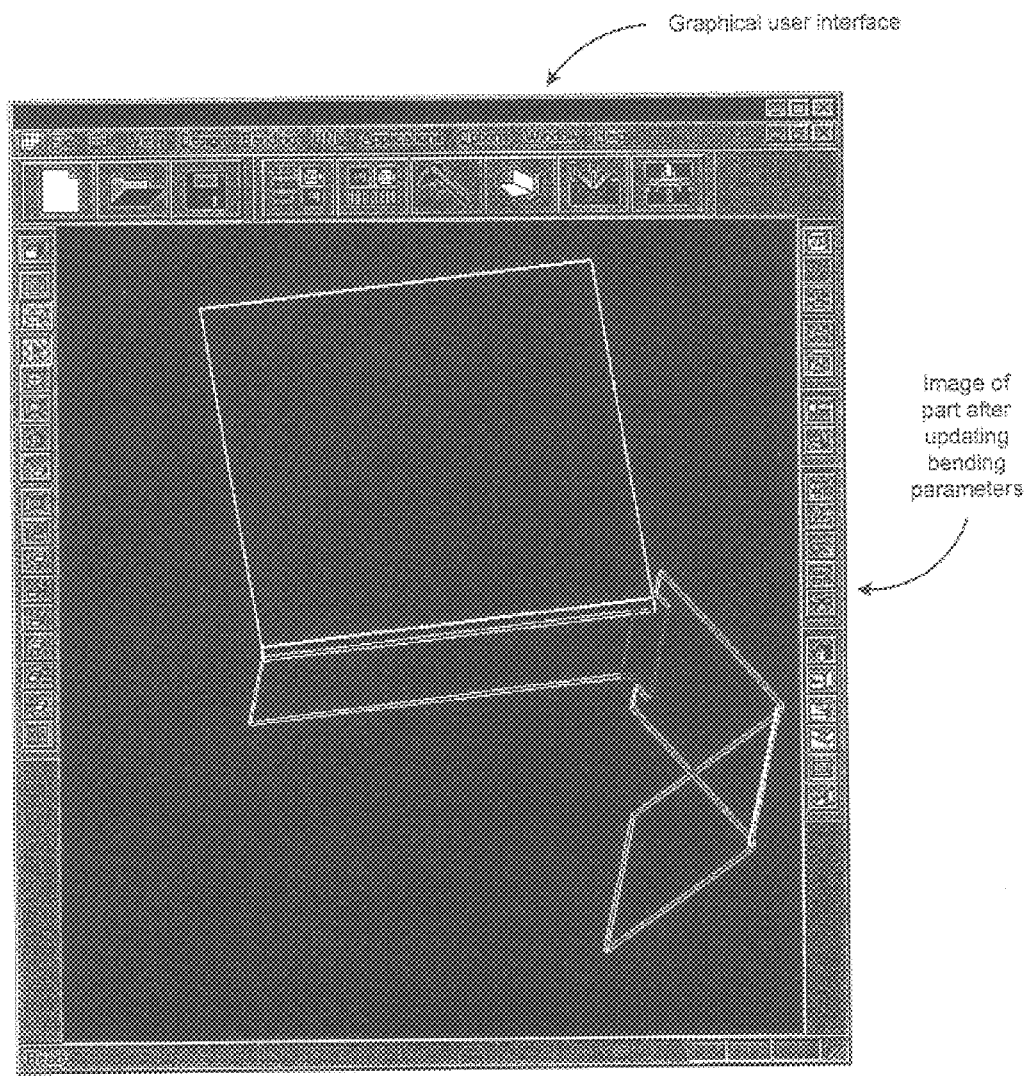

FIGS. 11A, 11B and 11C illustrate exemplary graphical user interfaces and display screens that may be provided when selecting a bendline and modifying the bending parameters associated with the selected bendline of the part. As shown in FIG. 11A, a display screen with a representation of the part may be provided to the user to permit the selection of the first adjacent face and the second adjacent face to define the bendline for which the bending parameters are to be set. The selected bendline may be highlighted or provided in a unique color on the display screen so that the user may confirm which bendline has been selected (see, for example, FIG. 11A). In addition, various methods may be provided for selecting a bendline. For example, a user may be permitted to directly select a bendline on the screen with a mouse device or keyboard and then the adjacent faces may be automatically determined and provided as input to the API function. Otherwise, the user may select on the display screen the first adjacent face and the second adjacent face to define the bendline.

After selecting the bendline, and indicating that the bending parameters are to be changed or set (e.g., by selecting an icon on the display screen or interface window), a bending parameters dialog box may appear on the display screen, as shown in FIG. 11B, to permit entry of the bending parameters. As shown in FIG. 11B, the bending parameters dialog box may permit the user to indicate the bend angle, the bend type (front/back), the bend deduction (BD), the inside radius (IR) and the flange dimensions of the bendline with respect to the first adjacent face and the second adjacent face (i.e., neutral, inside or outside).

After entering the bending parameters for the bendline with the bending parameters dialog box, the user may confirm the accuracy of the same (by, for example, selecting the "OK" hot key) and cause the entered bending parameters to be sent to the bend model part. Thereafter, as shown in FIG. 11C, the bend model part may be updated with the new set of bending parameters and the modified graphic representation of the part may be redisplayed to the user for confirmation, as shown in FIG. 11C.

In addition to setting the bending parameters for a bendline of the part, an API function may also be provided to facilitate the deletion of bendlines from the sheet metal part. For example, a Delete_Bendline function may be provided which causes all bendlines between two given faces to be deleted from the part. The input for the Delete_Bendline function should include the part name, and the names of the first adjacent face and the second adjacent face to the bendline(s) to be deleted. The bendlines may be identified and selected by a user by identifying the adjacent faces on the part and calling the Delete_Bendline function. When the bendline or bendlines are deleted, the adjacent faces will become unattached at their corresponding edges.

Figure 12A:
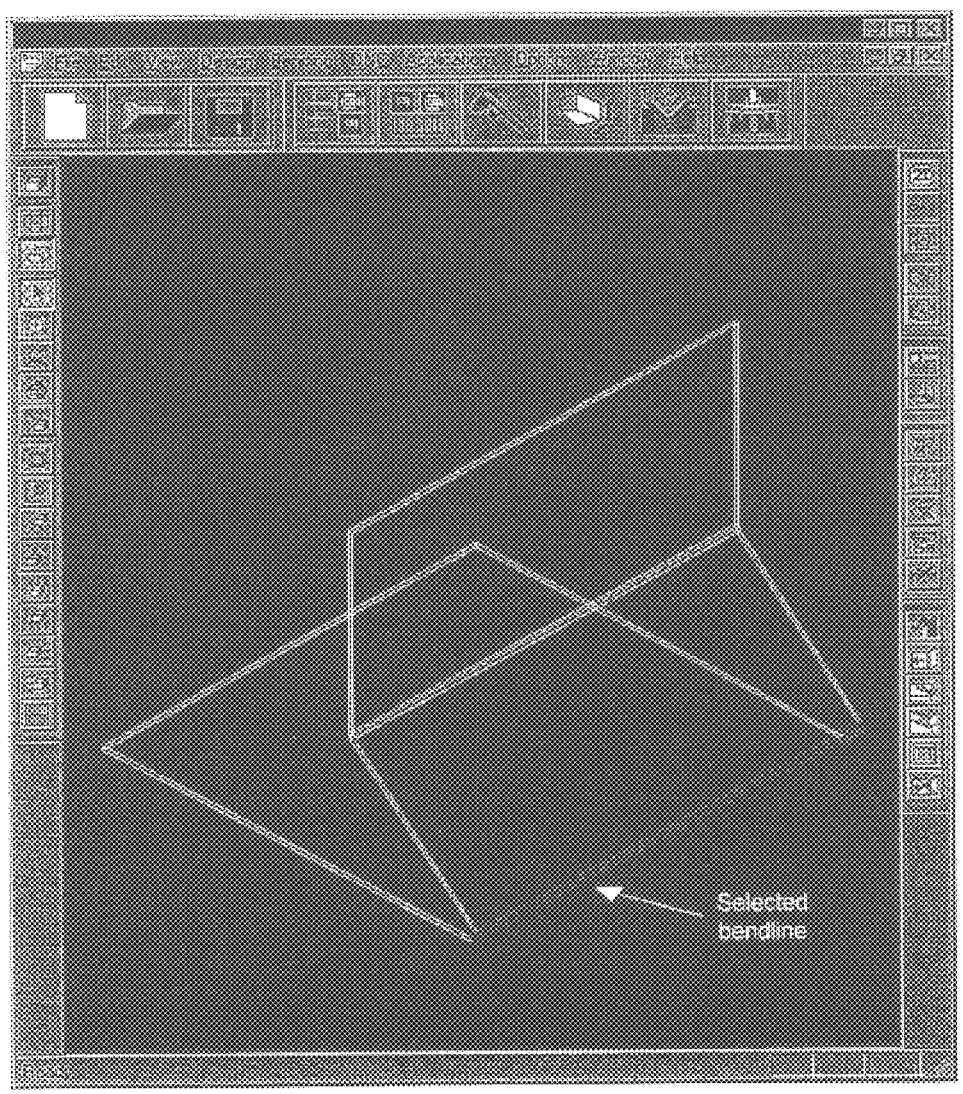
FIGS. 12A and 12B are illustrations of exemplary graphical user interfaces and display screens that may be provided when deleting a bendline defined between two selected faces of a part.
Figure 12B:
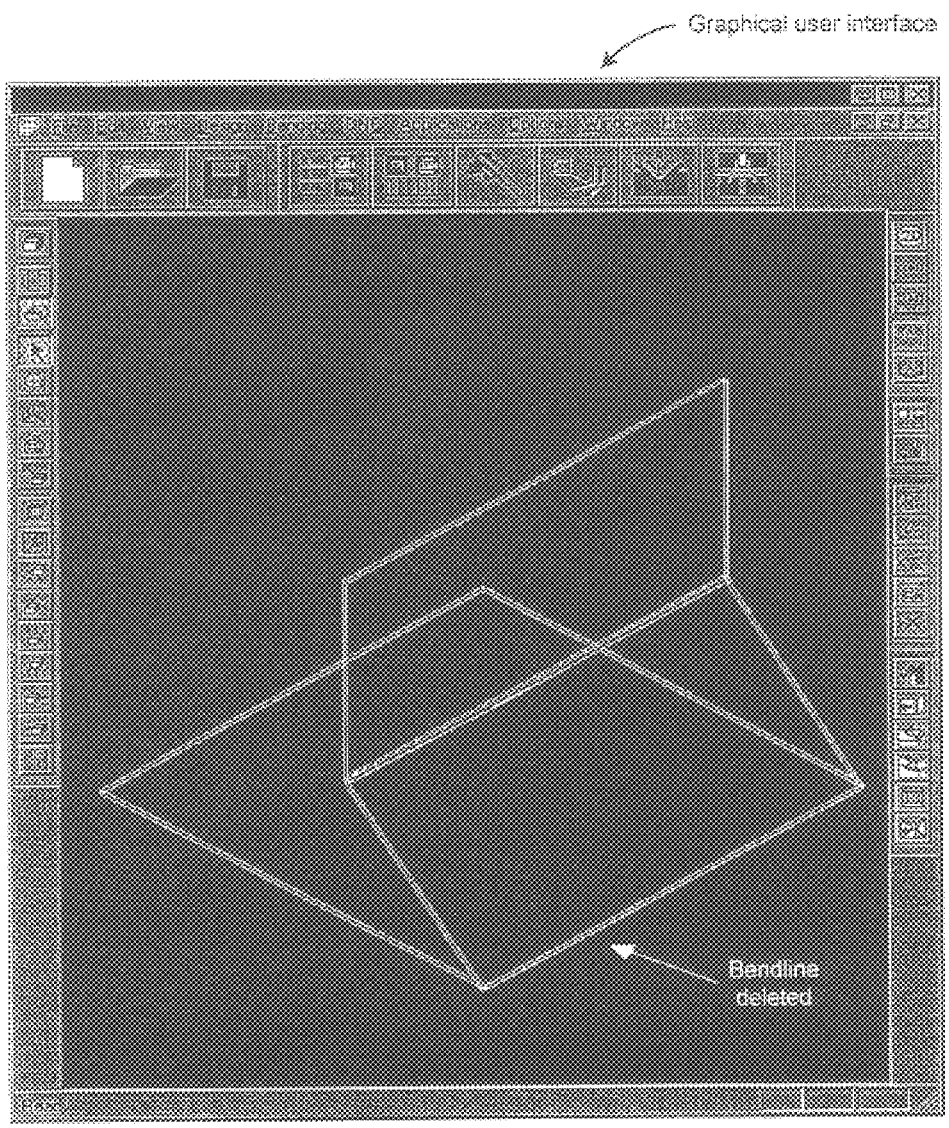

FIGS. 12A and 12B illustrate exemplary graphical user interfaces and display screens that may be provided to facilitate the deletion of bendlines. As shown in FIG. 12A, a representation of the part may be displayed to the user so that the bendline may be selected. Various methods may be provided for selecting a bendline. For example, a user may be permitted to directly select a bendline on the screen with a mouse device or keyboard, and then the adjacent faces may be automatically determined and provided as input to the API function. Otherwise, the user may select on the display screen the first adjacent face and the second adjacent face to define the bendline. Once the adjacent faces are selected, the bendline to be deleted may be identified. The selected bendline may be highlighted or displayed in a unique color on the display screen so that the user may confirm which bendline has been selected. Thereafter, the bendline or bendline attaching the two adjacent faces may be deleted so as to cause the faces to be unattached at their corresponding edges, as shown in FIG. 12B.

In addition to unattaching faces by deleting corresponding bendline(s), it may also be necessary for a user or design programmer to attach two faces at selected or specified edges. As indicated above in Table 1, an Attach_Faces function may be provided in the interface library to facilitate attachment of two faces in the bend model part. When two faces are attached, a bendline or a set of simultaneous bendlines may be created between the two specified faces. Besides specifying the part name as input to the Attach_Faces function, the names of the edges of the first face which define the bendline for the first face, and the names of edges of the second face which define the bendline for the second face may be provided as input. To properly align the faces, alignment information may also be provided to the Attach_Faces function as input when attaching two faces. That is, the user may provide data indicating the type and offset amount of the alignment with respect to the first face. In addition, a set of bending parameters to be defined for the newly created bendline(s) may also be provided as input by the user. For each bending parameter, a flag may be provided to indicate whether a default value is to be utilized for the bending parameter. When such a flag is set ON, a default value may be applied for a bending parameter when the bending parameter is not specified by the user.

Figure 20A:
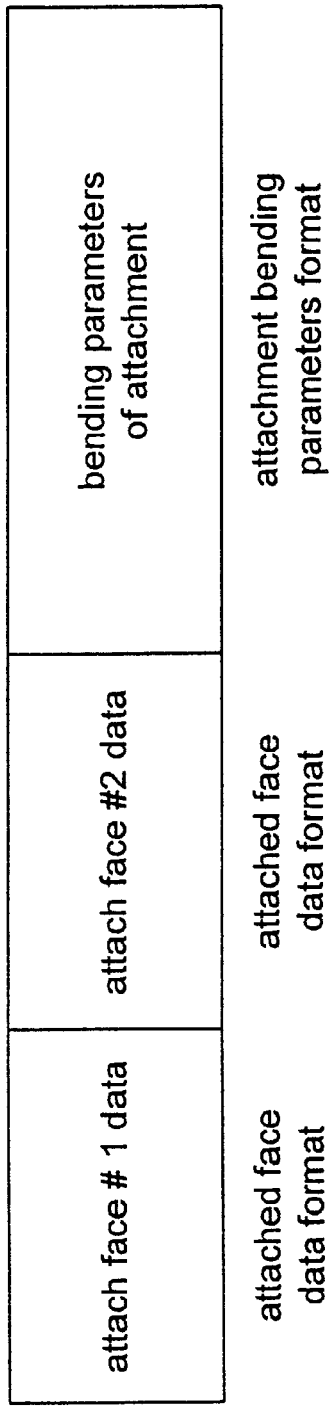
FIG. 20A illustrates an exemplary data structure and format of a buffer for transferring data relating to two faces of a part that are to be attached.

The data that is provided as input to the Attach_Faces function may be provided or written in a buffer having a predetermined format. For instance, FIG. 20A illustrates an exemplary data structure and arrangement to transfer data when attaching two faces with the Attach_Faces function, in accordance with an aspect of the present invention. As shown in FIG. 20A, the buffer may include parameter fields for defining or containing the following data: the attached face data for the first face (face #1) to be attached; the attached face data for the second face (face #2) to be attached; and the bending parameters for the attachment. The fields containing the attached face data for the first face and the second face may be set according to a predetermined format, such as the exemplary attached face data format described below with reference to FIG. 20B. In addition, the field containing the bending parameters for the attachment may also be set in accordance with a special or predetermined format, such as the exemplary attachment bending parameters format that is discussed below with reference to FIGS. 20C and 20D.

Figure 19:
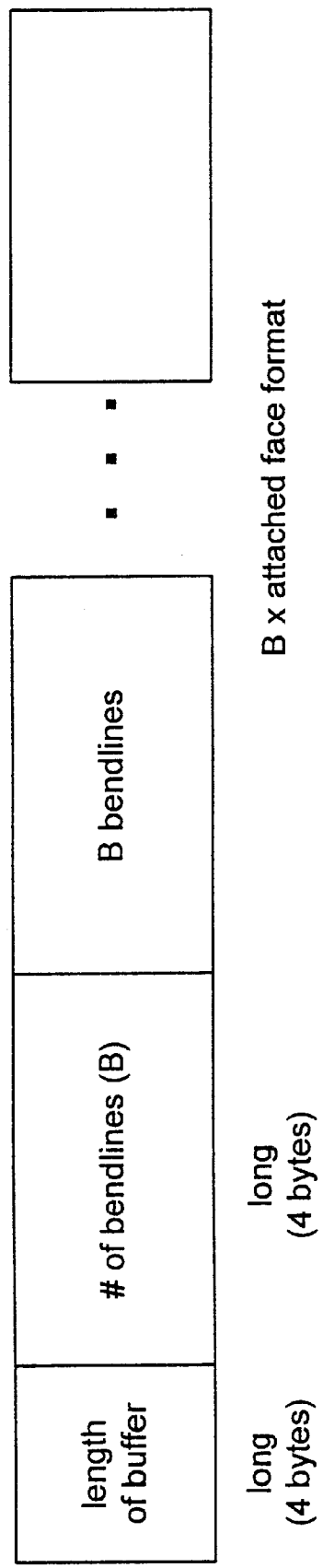
FIG. 19 illustrates an exemplary data structure and format of a buffer for transferring data relating to bendline and bending parameters for a part when sending the part data as a collection of faces.
Figure 20B:
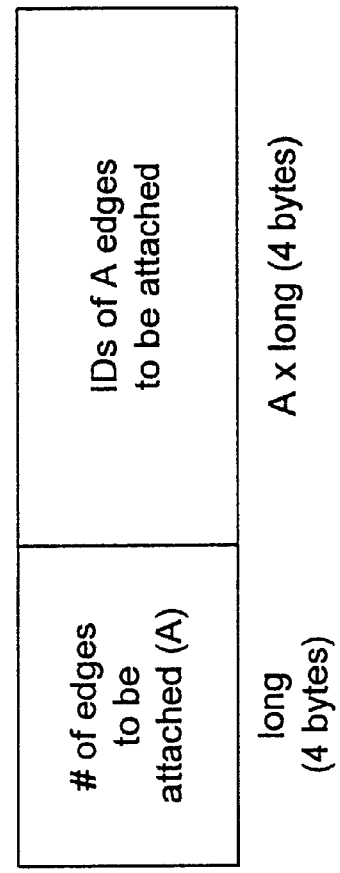
FIG. 20B illustrates an exemplary data structure and format of a buffer for transferring the attached face data, in accordance with an aspect of the present invention.

FIG. 20B illustrates an exemplary data structure and format for transferring attached face data. The attached face data format of FIG. 20B may be utilized when calling the Attach_Faces function (see, e.g., FIG. 20A) or when calling the Send_Faces function (see, e.g., FIG. 19 - discussed below). The attached face data format of the buffer, as illustrated in FIG. 20B, includes fields for storing or defining various parameters, including: the number of edges (A) in the face that are to be attached; and the identification numbers or IDs of each of the A edges of the face that are to be attached. As noted above, each of the edge IDs should be unique within the part, so that the edges to be attached may be accurately identified. Further, by keeping the edge IDs unique, the array or list of edge IDs that are stored in the buffer do not need to be sorted or maintained in any order. The length of the field defining the number of edges (A) in the face to be attached may be long, such as 4 bytes in length. The length of the field containing the IDs of the A edges may have a length equal to: A×4 bytes.

Figure 20C:
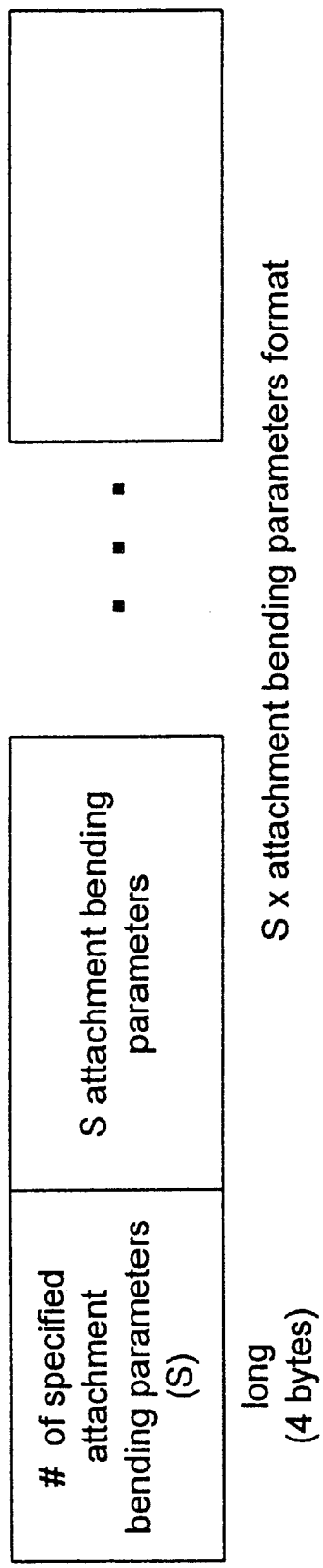
FIGS. 20C and 20D illustrate exemplary data structures and formats of buffers for transferring the attachment bending parameters data.
Figure 20D:
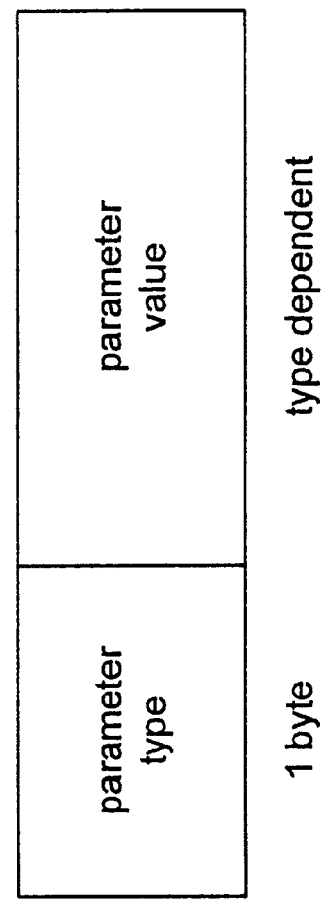

FIGS. 20C and 20D illustrate exemplary data structures and arrangements for transferring the attachment bending parameters. In particular, as shown in FIG. 20C, the attachment bending parameters format for the buffer (which may be provided as part of the buffer illustrated in FIG. 20A) may include fields for defining or storing various data and parameters, including: the number of the specified attachment bending parameters (S); and data for each of the S attachment bending parameters. The length of the field defining the number of specified attachment bending parameters may be long, such as 4 bytes in length. Further, the format or structure of the data for each of the S attachment bending parameters may set in accordance with a predetermined format, such as that illustrated in FIG. 20D. As illustrated in FIG. 20D, the buffer containing the data for each attachment bending parameter may include fields for defining or storing the following: a parameter type; and a parameter value. The parameter type may be a character and the field defining the parameter type may have a length of 1 byte. The field containing the parameter value may have a length which varies depending on the parameter type. By way of a non-limiting example, Table 3 indicates the values that may be assigned for the parameter type to indicate different types of parameters. In addition, Table 3 indicates, according to parameter type, the length of the parameter value field that may be provided in the buffer.

TABLE 3

PARAMETER DATA

| PARAMETER | PARAMETER TYPE | PARAMETER VALUE (Size) |
| --- | --- | --- |
| Angle | Type 0 | 8 bytes |
| Bend Deduction | Type I | 8 bytes |
| Inside Radius | Type 2 | 8 bytes |
| Dimension for adjacent flange 1 | Type 3 | 1 byte |
| Dimension for adjacent flange 2 | Type 4 | 1 byte |

In Table 3, the dimensions for the adjacent faces or flanges may be defined with respect to the corresponding bendline. The parameter value for each dimension may indicate how the dimensions are to be measured with respect to the thickness of the part and may be defined according to a dimension type (character—1 byte) in accordance with the following: Unknown—Type 1; Neutral—Type 2; Inside—Type 3; Outside—Type 4. In most cases, only Inside or Outside dimension types should be permitted. In such a case, Outside may be set as the default dimension type.

Figure 13:
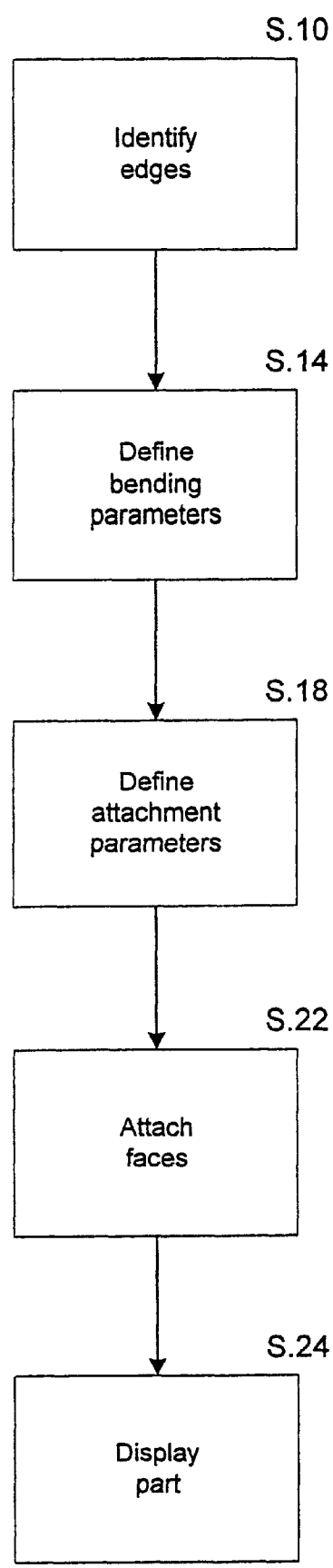
FIG. 13 is an exemplary flow chart of the various processes and operations that may be carried out when attaching two edges of a part, in accordance with an aspect of the present invention.
Figure 14A:
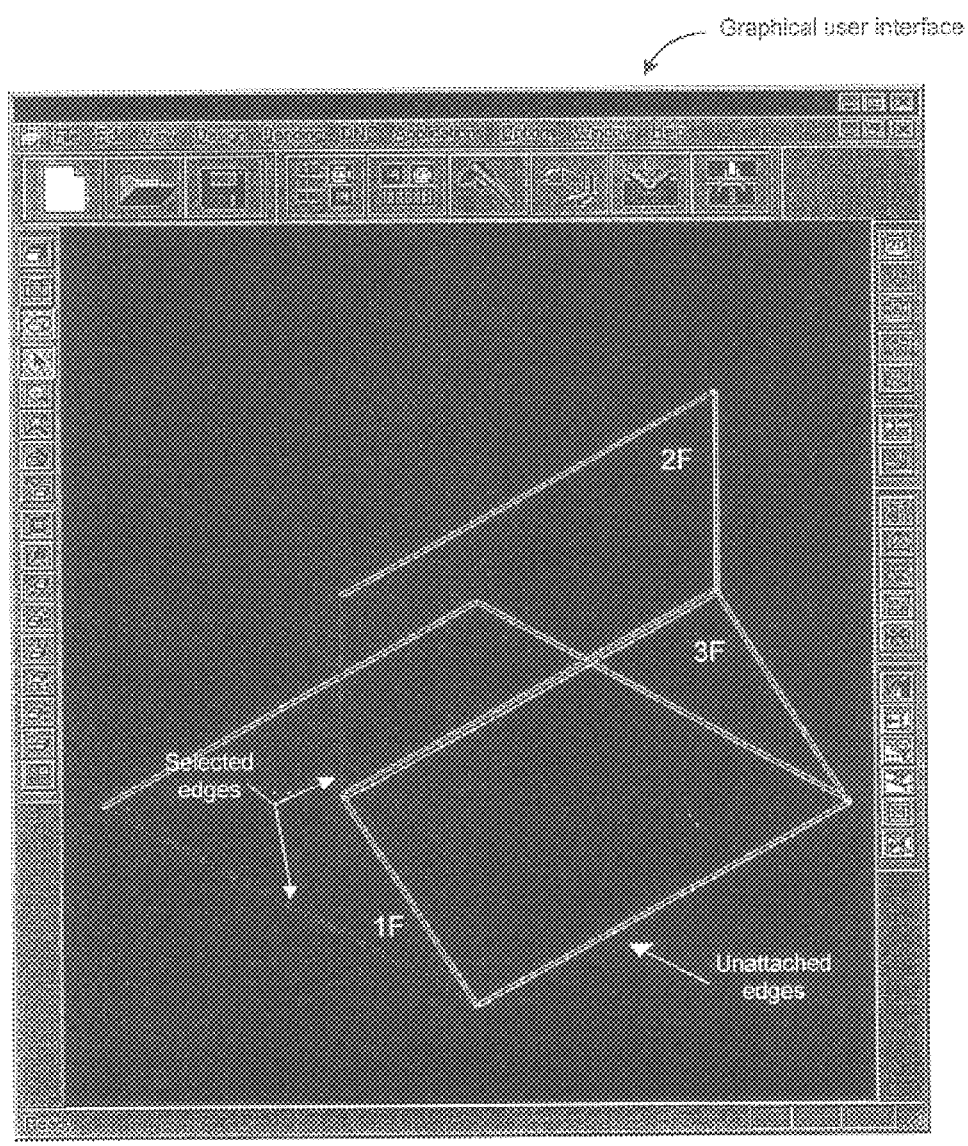
FIG. 14A is an illustration of an exemplary graphical user interface and display screen that may be provided when selecting edges of faces of a part to perform an attach process.

FIG. 13 illustrates an exemplary flow chart of the various processes and operations that may be carried out when attaching two edges of a part. The attach process may be implemented through software in the 2-D CAD program or the bend model program. Initially, at step S10, the edges of the faces to be attached are identified. For each face, a set of edges should be identified to define the bendline for the attached faces. The set of edges may include one or more edges of each face and each edge should be identified by a name. Once again, a graphical user interface may be provided to facilitate the selection of the edges by the user. FIG. 14A illustrates an exemplary user interface that may be provided for selecting edges. With the use of a mouse device or another type of input device, a user may select the set of edges for each face. In FIG. 14A, a line edge of a first face 1F is selected and a line edge of a second face 2F is also selected. In addition, it is noted that in the represented part of FIG. 14A, the first face 1F and a third face 3F are not attached.

Figure 14B:
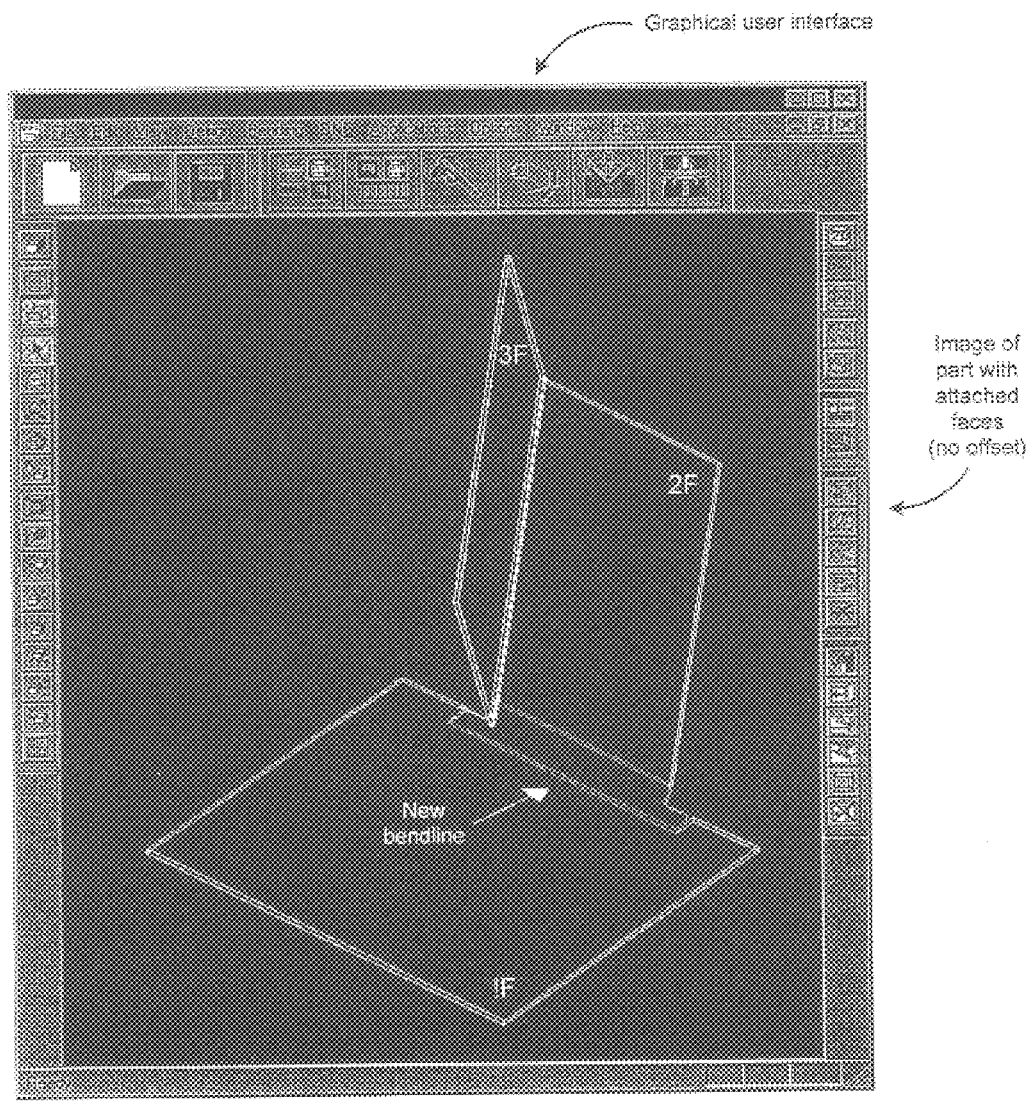
FIG. 14B is an illustration of an exemplary graphical user interface and display screen that may be provided after attaching two edges of the part with no offset value being defined.
Figure 14C:
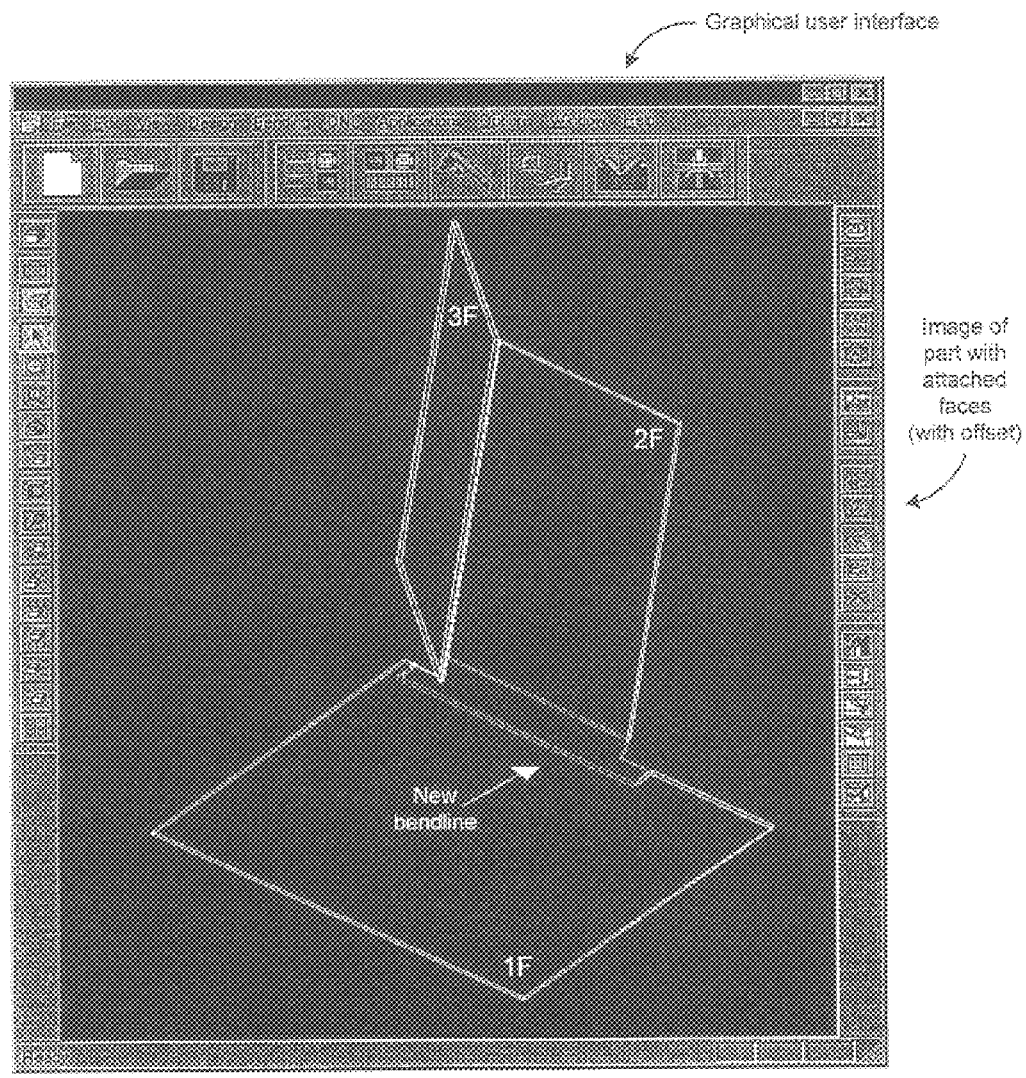
FIG. 14C is an illustration of an exemplary graphical user interface and display screen that may be provided when attaching two edges of a part with a defined offset.
Figure 14D:
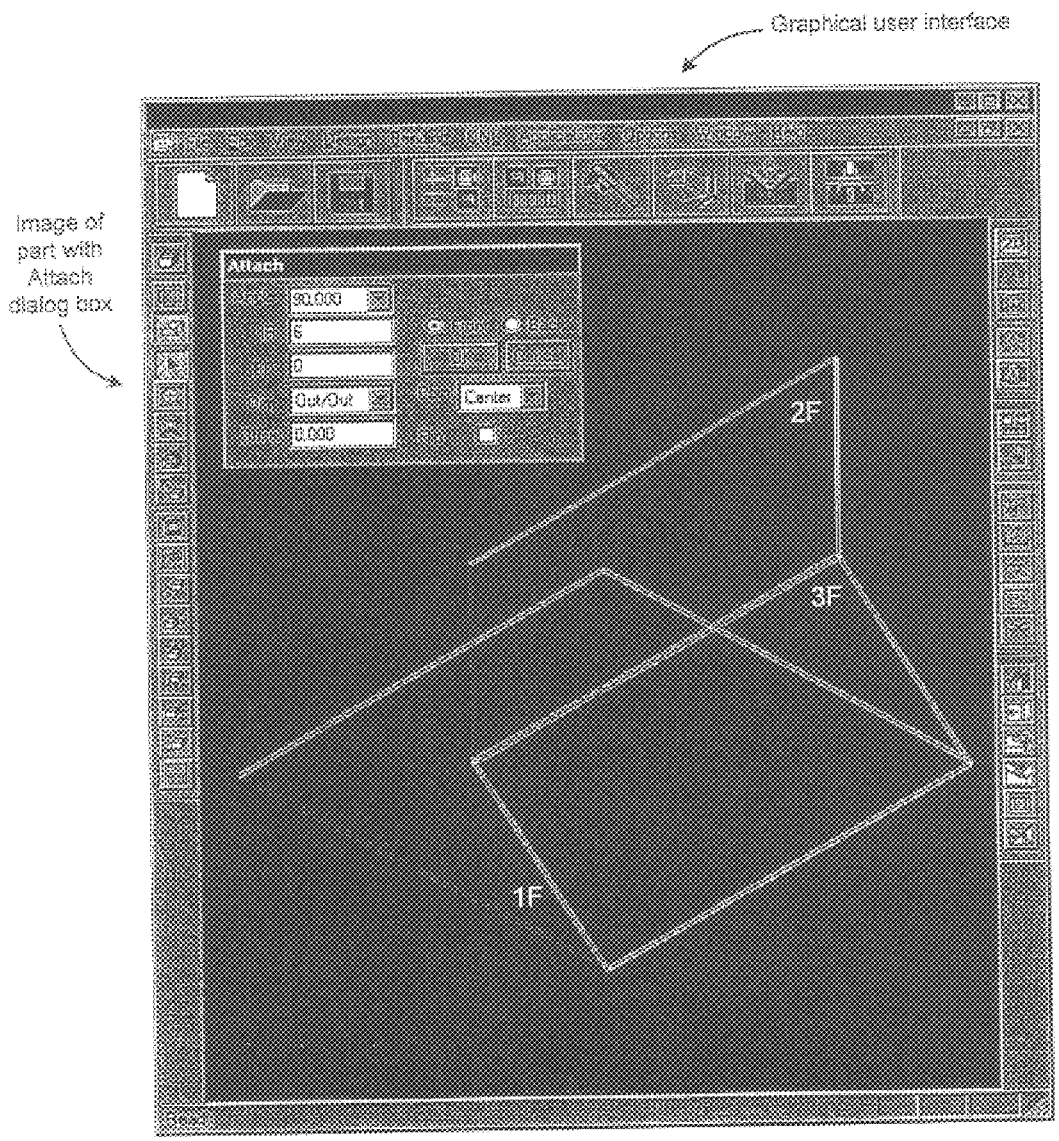
FIG. 14D is an illustration of an exemplary graphical user interface and display screen which includes an Attach dialog box to permit a user to enter various parameters when performing an attach process.

After identifying the edges of each face, at step S14, a user may then define the bending parameters to be associated with the bendline(s) that will be created between the faces to be attached. The bending parameters to be set by the user may include the bend angle, the bend type (front/back), the bend deduction amount, the inside radius and the flange dimensions of the bendline with respect to the first face and the second face. In accordance with an aspect of the present invention, a dialog box or display screen may be provided to the user to facilitate the entry of the bending parameters. FIG. 14D illustrates an exemplary graphical user face and dialog box that may be displayed to the user along with the representation of the bend model of the part. As shown in FIG. 14D, the Attach dialog box may include fields for permitting an operator to enter the bend angle (Angle), the bend type (i.e., front or back), the bend deduction amount (BD), the inside radius (IR), and the flange dimensions (Dim) of the bendline with respect to the first face and the second face (neutral, inside, outside).

In addition to defining bending parameters, various attachment parameters may also be defined by the user and included as input to the Attach_Faces function. When entering attachment parameters at step S.18, reference positioning data, offset data and flip option data may be defined. The reference positioning data may indicate a point from which the second face is to be aligned with respect to the first face when attaching the faces. In general, three options may be provided: (1) start-point; (2) center-point; and (3) end-point. When a start-point is indicated, the start-point of the bendline of the first face will be aligned or matched with the end-point of the bendline of the second face. In contrast, a center-point will cause the faces to be aligned by matching the center-points of the bendlines of the respective faces. In this regard, if collinear bendlines exist for a face, a spanning line may be defined across the collinear bendlines and a center-point of the spanning line may be used to align the face with respect to the center-point of the other face. If an end-point is selected by the user, then the end-points of the bendlines of the faces will be matched when attaching the faces.

In accordance with an aspect of the invention, a user may also enter offset data when defining the attachment parameters at step S.18. The offset data may indicate the relative shift that should exist with respect to the alignment points of the faces when attaching the edges of the faces. The offset amount may be used to move the second face in the direction of the bendline relative to the first face (which acts as a base face for the offset). The offset may be entered in inches, millimeters or another appropriate dimension, and the shift may occur in the positive (+) or negative (−) direction relative to the direction of the loop defining the base face. That is, the direction of a positive offset is the direction of the bendline with respect to the first face. Flip option data may also be set when defining the attachment parameters at step S.18. When the flip option is set ON, the first face and the second face may be flipped by 180° with respect to one another. If the flip option is turned OFF, then the faces are not flipped with respect to one another when attaching the edges of the faces.

Referring again to FIG. 14D, the various attachment parameters defined at step S.18 may be performed through an Attach dialog box that is displayed to the user. In particular, various fields may be provided in the Attach dialog box to permit a user to enter the offset amount (Offset), the reference point (i.e., start-point, center-point or end-point) and to activate or deactivate the flip option (Flip). The various attachment parameters and the bending parameters, when defined by user, may be included as input to the Attach_Faces function when exchanging data between the 2-D CAD program and the bend model program. An "OK" hot key may be provided in the Attach dialog box to permit the user to confirm that the values entered for the attach process are correct.

Referring again to FIG. 13, after various edges and parameters have been defined, the faces may be attached at step S.22. When attaching the faces, a bendline or set of simultaneous bendlines will be created between the two faces in accordance with the defined bending parameters. In addition, the various attachment parameters will be utilized to align the faces with respect to one another. If either the first or second face is attached at one of its edges to another face so as to prevent the first and second faces being attached, then an error message may be provided back to the user to indicate that the faces can not be attached. If the attachment of the faces is successful, then the results of the attach process may then be set to the bend model of the part to update the 2-D and/or 3-D representations of the part. Thereafter, at step S.24, the modified or updated part may be displayed to the user after the faces have been attached. FIG. 14B illustrates a representation of the part model in FIG. 14A after it has been attached with no offset amount. In contrast, FIG. 14C illustrates a graphic representation of the part in FIG. 14A after it has been attached with an offset amount.

In addition to attaching faces, a separate API function may be provided to facilitate the shifting of one face with respect to another face when a bendline is already defined between two faces. That is, a Shift_Face function may be provided to shift a secondary face (i.e., a second face) with respect to a base face (i.e., a first face). The input to the Shift_Face function should include the name of the part, the name of the first face that will not move, and the name of the second face which is moved relative to the first or base face. In addition, the amount by which the second face is to be shifted with respect to the first face should also be provided as input to the Shift_Face function.

When moving one face with respect to another face, the second face will be shifted with respect to the first or base face. The direction of the shift may be defined in accordance with various conventions, including the direction of the bendline of the base face. When shifting a face, new bendlines may be created wherever the two faces are touching at their edges. There should be at least one bendline between the two faces before a shift function is performed. If there are no bendlines between the two faces, then a shift is not possible because a bendline is required to define the line along which the shift operation will be performed.

Figure 15A:
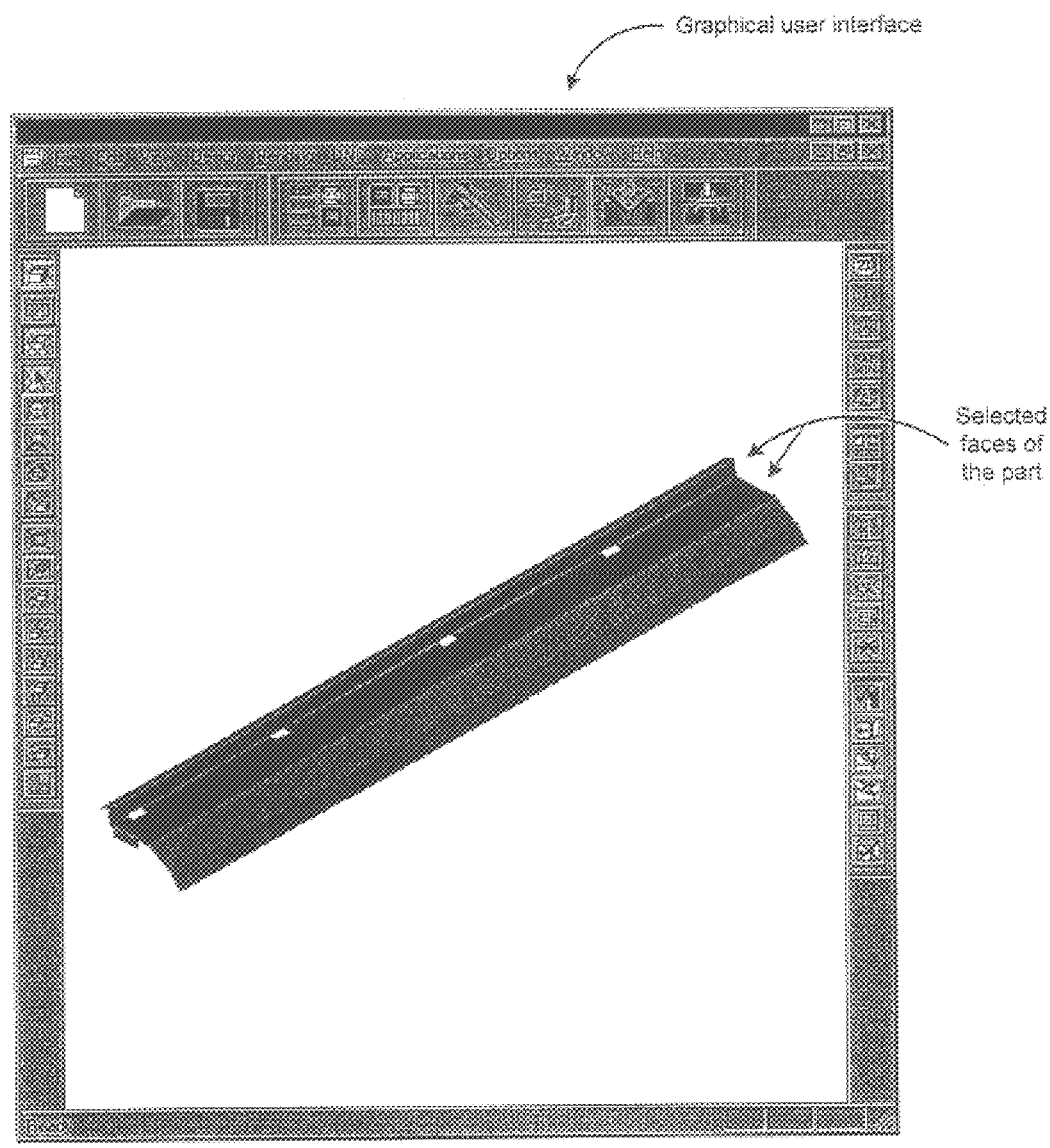
FIGS. 15A, 15B and 15C are illustrations of exemplary graphical user interfaces and display screens that may be provided when performing a shift operation to shift one face relative to another face and, thereby, modify the part geometry according to a shift amount.
Figure 16:
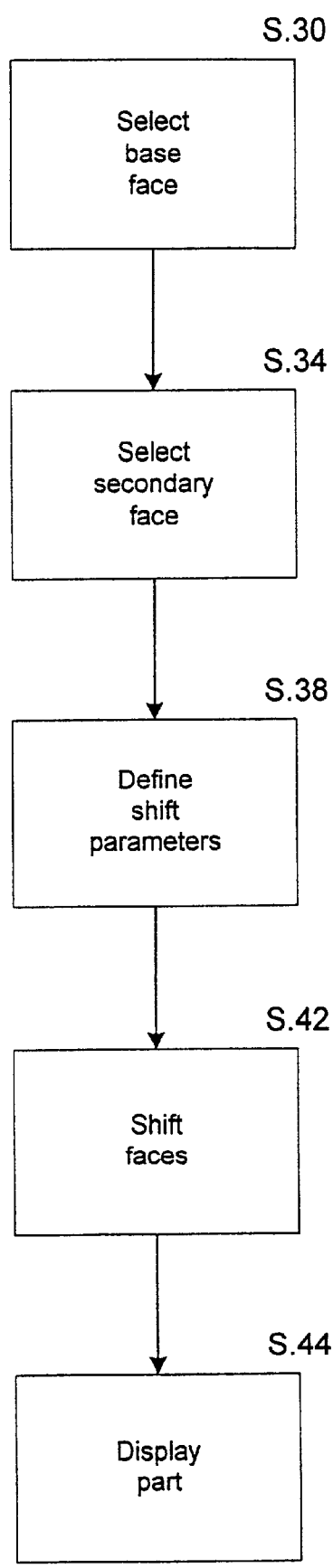
FIG. 16 is an exemplary flow chart of the various processes and operations that may be carried out when shifting faces of a part, in accordance with an aspect of the present invention.

The shift operation may be implemented with software as part of the 2-D CAD program or the object oriented bend model program. FIG. 16 illustrates an exemplary flow chart of the various processes and operations that may be performed when carrying out a shift operation on the faces of the part. As illustrated in FIG. 16, at step S.30, the first or base face of the part is selected. The base face or first face is the face which does not move when performing a shift. After selecting the base face, the second or secondary face of the part is selected at step S.34. The second face is a face that is shifted with respect to the first face. Once again, a graphical user interface may be utilized to facilitate the selection of the base face and secondary face by the user. FIG. 15A illustrates an exemplary user interface and display screen that may be utilized for selecting the faces. By moving a mouse device or operating a keyboard device, a user may select the base face and secondary face of the part represented in the display screen. As shown in FIG. 15A, after each of the faces are selected, the selected faces may be colored with a unique color or highlighted to confirm the selection of the same.

Figure 15B:
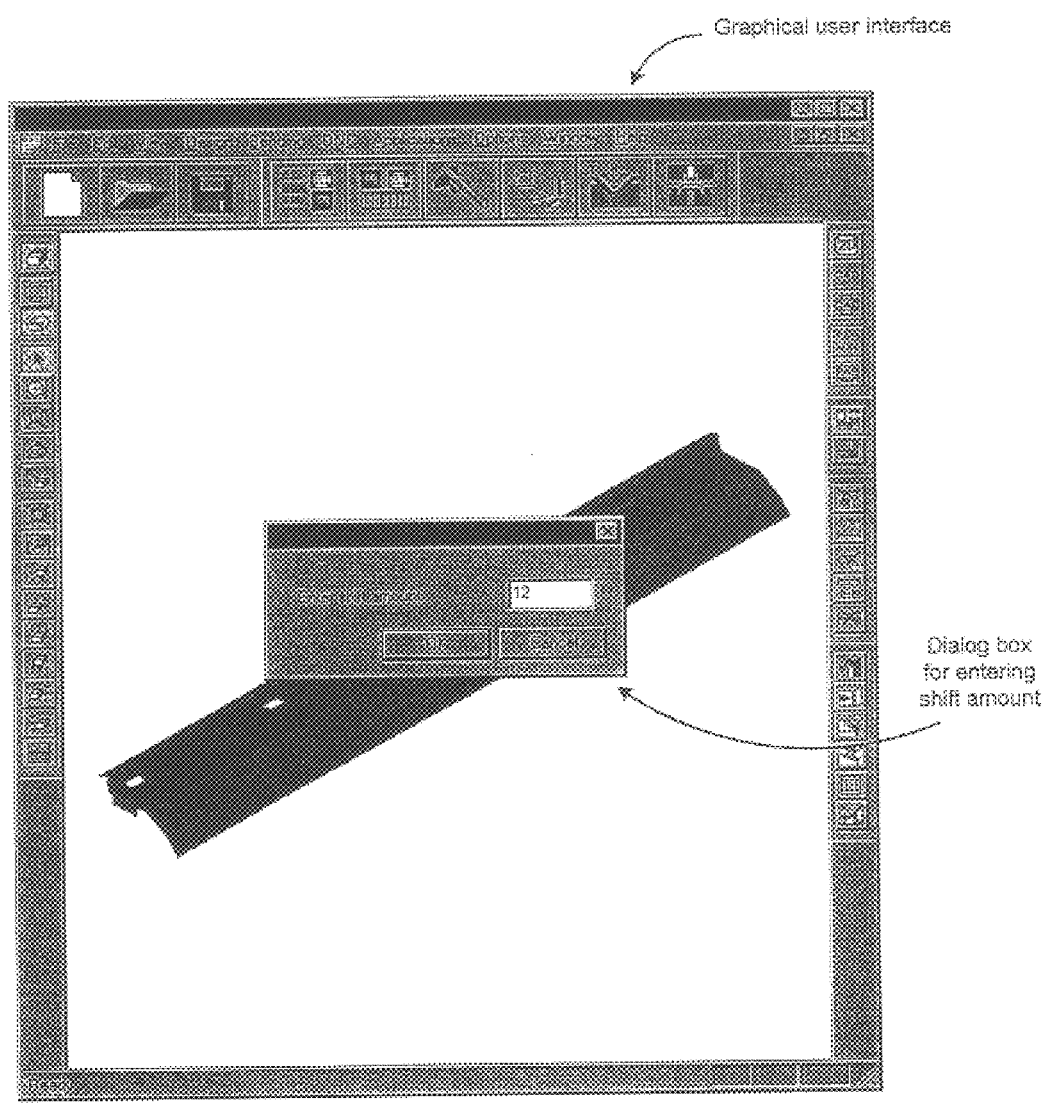
Figure 15C:
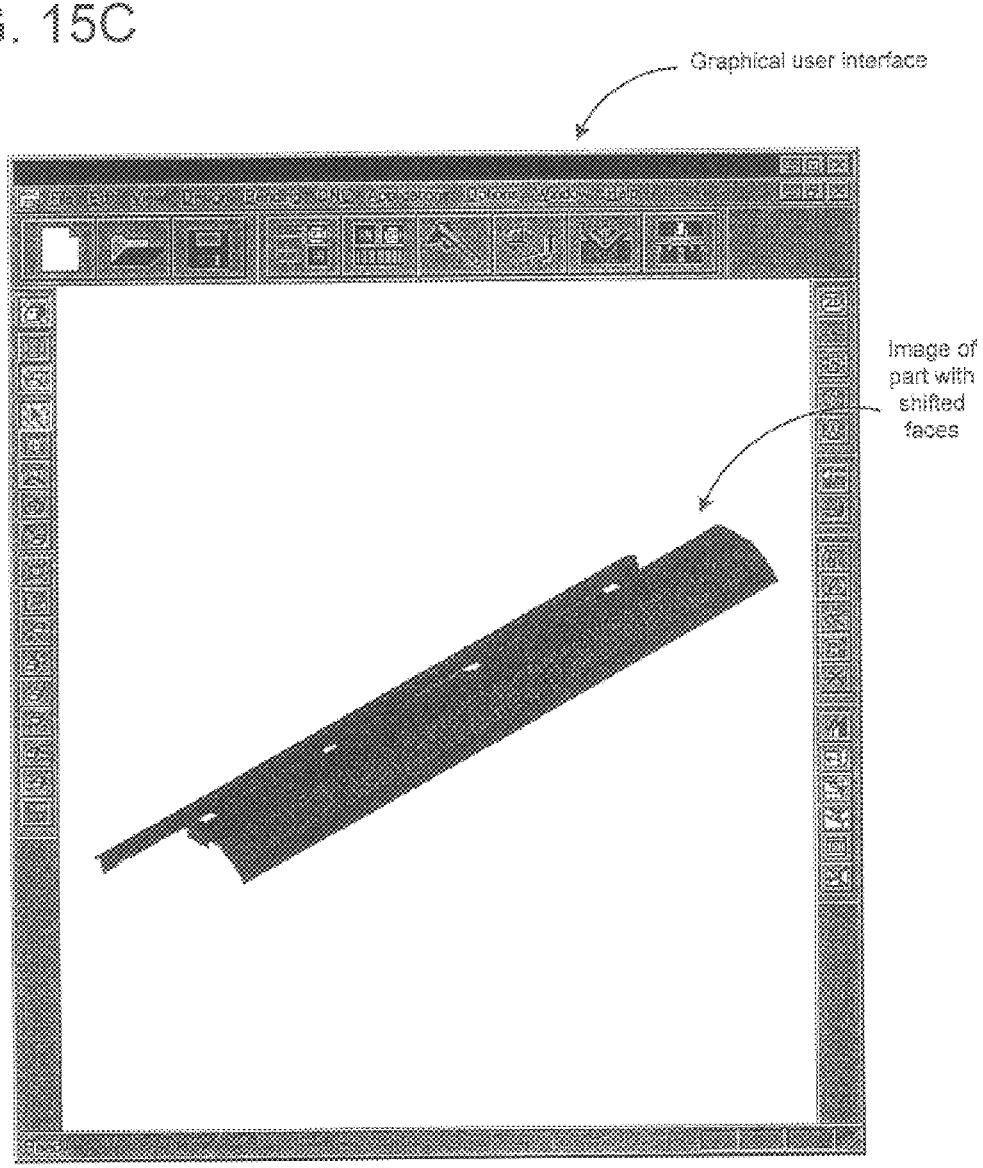

After selecting the base face and the secondary face for the shift operation, the shift parameters are defined at step S.38. In accordance with an aspect of the invention, the shift parameters may include a shift amount by which the secondary face is to be moved with respect to the base face. As shown in FIG. 15B, a dialog box may be displayed to the user to prompt for the entry of the shift amount. The shift amount may be entered in millimeters, inches or another appropriate dimension. After the shift amount is entered by the user, the secondary face may be shifted with respect to the base face by the indicated shift amount, at step S.42. The objected oriented bend model of the part may then be updated and the resultant part displayed to the user at step S.44. FIG. 15C illustrates an exemplary user interface and display of the sheet metal part in FIG. 15A after a shift operation has been performed.

Other API functions may be provided in the communication library of the interface to facilitate the modeling and design of the sheet metal part. For example, as indicated in Table 1, an Auto_Detect_Collinear_Bendlines function may be provided for the purpose of automatically detecting which bendlines are collinear in the part. Input to this function should include at least the part name of the part for which collinear bendlines are to be detected. When this function is performed, all defined bendlines in the part may be analyzed to determine if collinear bendlines are properly marked as collinear bendlines. If a bendline is not properly marked or flagged as a collinear bendline, then the function may mark the bendline as such. Since this function relies on the presence of bendlines in the part, all bendlines in the part should be created or defined in the part before the function is utilized. Collinear bendlines may be indicated in the part geometry or topology information in the bend model of the part. Collinear bendlines may be detected or identified based on the existence of bendlines along a common axis or line. In addition, the various methods and operations for automatically detecting collinear bendlines in a part, such as that disclosed in U.S. patent application Ser. No. 08/706,830, filed Sep. 3, 1996, in the names of K. HAZAMA et al., entitled "Apparatus and Method for Integrating Intelligent Manufacturing System with Expert Sheet Metal Planning and Bending System", may be utilized in either the 2-D CAD program or the bend model program to implement this function. The disclosure of U.S. patent application Ser. No. 08/706,830 is expressly incorporated herein by reference in its entirety.

Figure 17:
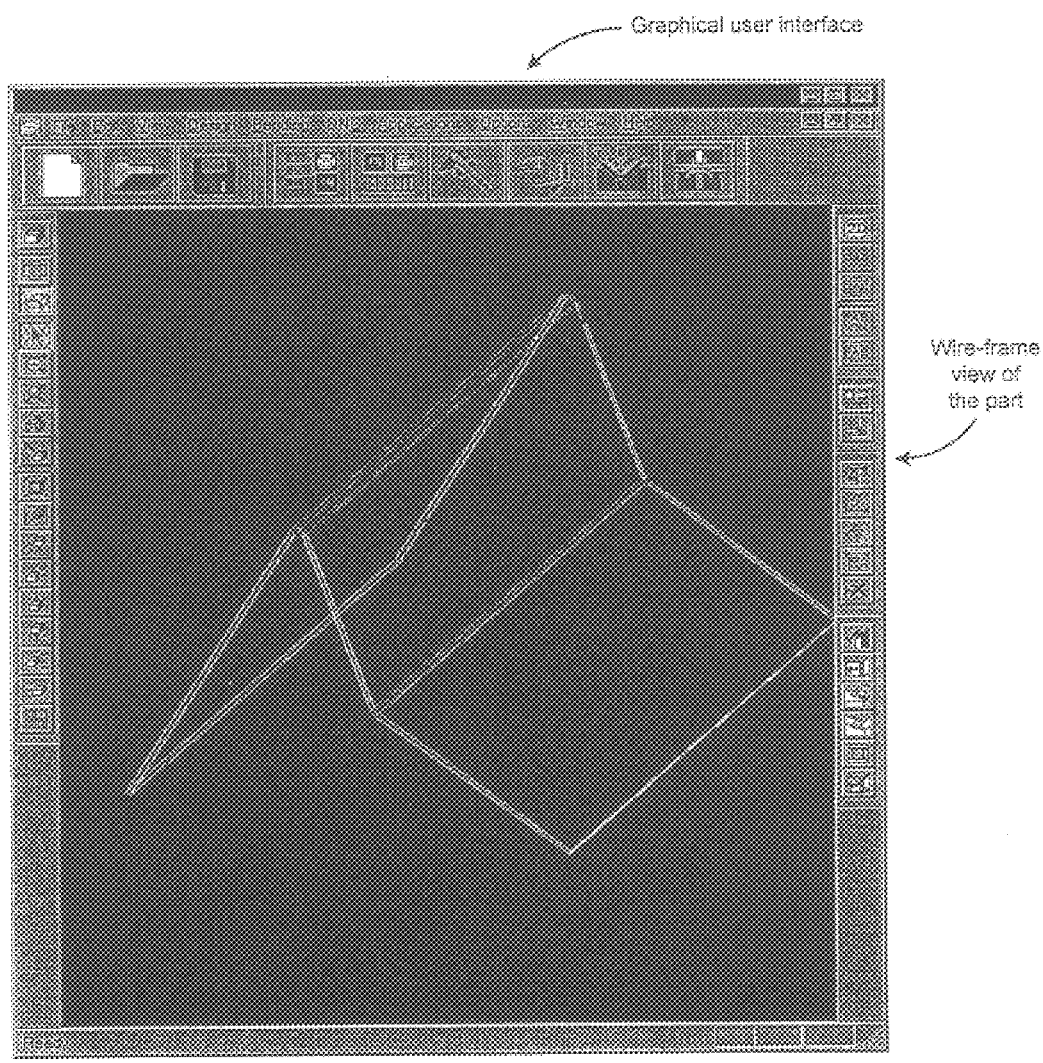
FIG. 17 is an illustration of an exemplary graphical user interface and display screen that may be provided when sending or receiving a 2-D wireframe view of the part, in accordance with another aspect of the invention.

In addition, an Add_View function may be provided to create a view instance from basic flange data (given, for example, as a set of edges) and to add the view to a given layout of the part. The Add_View function may be utilized to send, for example, a 2-D wire-frame view of the part from the bend model program to the 2-D CAD program, so that this data may be utilized to perform drawing and editing functions in the 2-D CAD environment. In this regard, it is possible to project a 3-D wire-frame view into a 2-D plane, and to send the resultant 2-D wire-frame to the 2-D CAD system. FIG. 17 illustrates a graphic representation of an exemplary 2-D wire-frame view that may be sent to the 2-D CAD program using the Add View function. To create a view instance with the Add View function, the view data should be passed in accordance with a predetermined view format. The buffer containing the view data may be provided along with the part file name and a view identification number or ID as input to the Add_View function. With respect to the view format, the buffer containing the view data may include various parameters for defining: the length of the contents of the buffer; the number of edges (E) in the view; and edge data defining each of the E edges in the view. The length of the parameter field defining the length of the buffer may be long, such as 4 bytes. The indicated length of the buffer should not include the 4 bytes utilized by the length parameter field. The field defining the number of edges (E) in the view may also be long, such as 4 bytes in length. Finally, the data defining each of the E edges in the view may be stored in the buffer in accordance with the edge format described above with reference to FIG. 8B. As such, the field of the view data buffer containing the data for each of the edges in the view may have a length equal to: Exedge format.

As further shown in Table 1, a Set_View_Update_Mode function may be provided for the purpose of setting a view update mode of the part to be ON or OFF. The input to this function should include the part name to which the view update mode is to be applied, as well as a flag or character that sets the view update mode to be ON or OFF. When the view update function is turned ON, the view of the part will be updated as each change is being made to the part in either the 2-D CAD program or the bend model program. This will cause updates to be transferred to the object oriented bend model and the viewer with each change that is made to the part. If the update function is turned OFF, the view of the part as represented in the bend model will not be updated after each change made to the part and, as a result, the bend model data relating to the part will only be updated when the modified face and/or part data is sent to the bend model program.

To send data relating to the part to the bend model program using the interface, API functions may be provided to permit transfer of the part data in various formats. For example, in accordance with an aspect of the invention, the part data may be set as a collection of attach faces or as a flat version of the part (without any face data). In this regard, a Send_Faces function and a Send_Flat function may be provided in the interface library. The Send_Faces function and a Send_Flat function are described below with reference to FIGS. 18A and 18B.

With the Send_Faces function, a version of the part is sent as a collection of attached faces by sending basic flange information in the form of data including a set of loops, as well as data defining the bendlines and bending parameters. FIG. 18B is a graphic representation of a collection of attached faces that may be sent for a part with the Send_Faces function. Sending the part as a collection of faces may be useful when it is necessary to revise the faces of the part or make other revisions to the design of the part. The input to the Send_Faces function should include: the part name; the faces data of the part written in a buffer provided as a set of face data (see, e.g., the face data format described above with reference to FIG. 7A); and the data defining the bendlines and bending parameters (e.g., bending angle, inside radius, bend deduction, bend type, etc.) written in a buffer provided as a set of single bendline data. The bendline and bending parameters data may be provided and passed with the Send_Faces function in accordance with a special or predetermined format. For instance, FIG. 19 illustrates an exemplary data structure and arrangement for transferring the bendline and bending parameters data.

As shown in FIG. 19, the buffer containing the bendline and bending parameters data may include fields for storing the following parameters and data: the length of the bendline/bending parameter data buffer; the number of bendlines (B); and the bendline and bending parameter data for each of the B bendlines. The length of the field defining the length of the buffer may be long, such as 4 bytes, and the length of the buffer should not include the 4 bytes taken by the buffer length field. The length of the field defining the number of bendlines may also be long or 4 bytes in length. Further, the format for the bendline/bending parameter data may be set in accordance with a predetermined format, such as the attached face format illustrated in FIG. 20B. A detailed description of the attached face format illustrated in FIG. 20B is provided above.

Figure 18A:
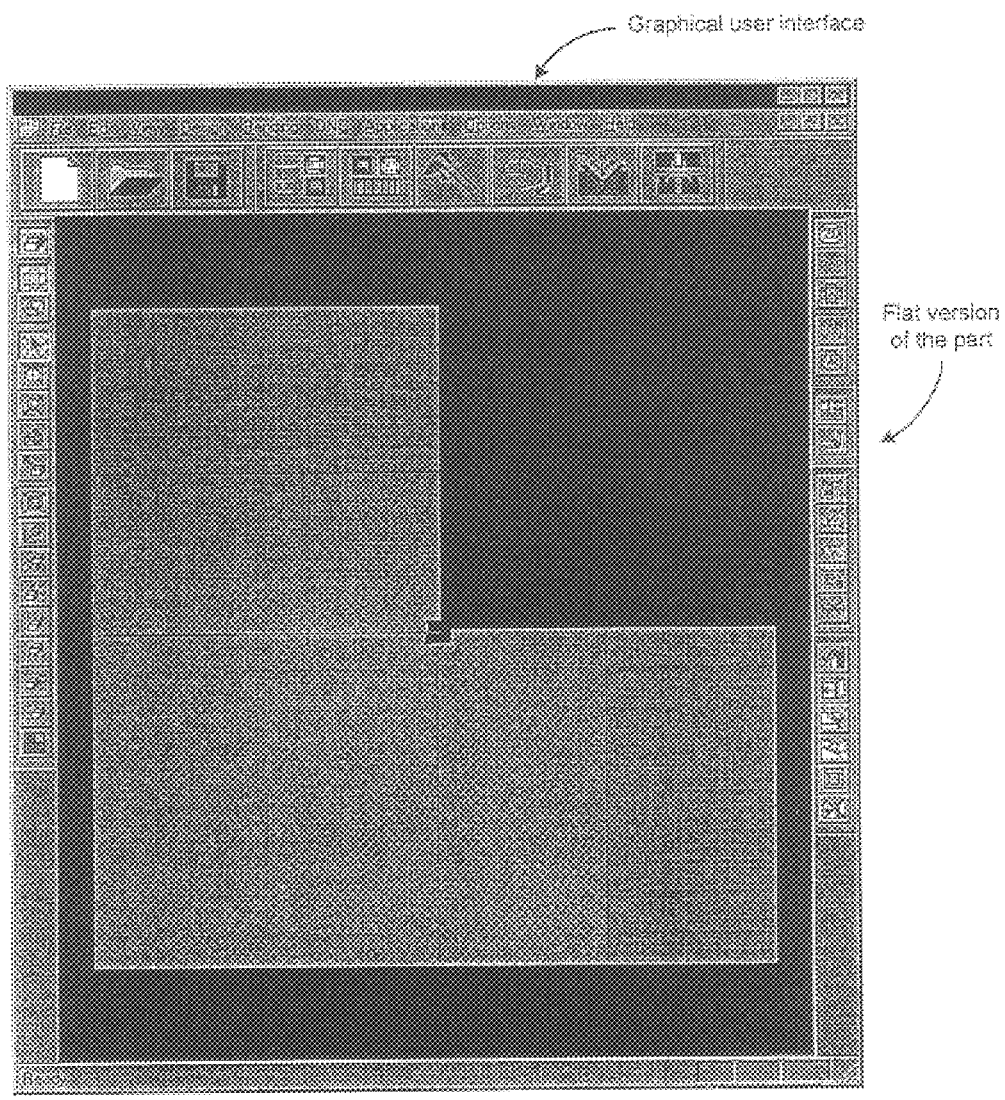

In addition to the Send_Faces function, a Send_Flat function may be provided to permit a user to send a flat version of the part. This function permits a user to send or create a database of edges from raw CAD geometry. FIG. 18A illustrates a graphic representation of a flat version of a part that may be sent with the Send_Flat function. As shown in FIG. 18A, the flat version of the part may include manufacturing information such as the required cut-outs in the part for performing clean bends on the part. The input provided to the Send_Flat function should include the part name, a flat version of the part provided in a buffer as a set of edges in 3-D space (such as in accordance with the face, loop and edge format described above with reference to FIGS. 7A, 7B, 8A and 8B), and default parameters for various bending parameters including the bending angle, inside radius, bend deduction and bend type. In addition, flag values may be provided as input to the Send_Flat function to indicate whether to perform various functions, such as Auto_Detect_Collinear_Bendlines and Set_Default_Bending_Parameters. Flags may also be provided as input for the bending parameters to set one or more of the default bending parameters.

The Send_Flat function may be utilized to develop a representation of the part with face data from raw CAD geometry. Once a database of edges is created from the flat version of the part, a face detection algorithm such as that disclosed in U.S. patent application Ser. No. 08/690,671 can be utilized to create basic flange information in the form of loops. This information may then be used to create flanges of the part. Thereafter, fold and/or unfold algorithms, such as those disclosed in U.S. patent application Ser. No. 08/690, 671, may be performed to develop a 3-D model of the part and/or an object oriented bend model of the part containing face data.

Additional API functions may be provided in the communication library of the interface. For example, a Set_Fold_Mode function may be provided for the purpose of setting a flag to indicate a FOLD or UNFOLD mode of transmission of the geometry data. Essentially, this function may be used to effect the dimension of the flanges as well as other geometry elements. If a customer's specifications for a part are initially provided in 2-D, then a FOLD mode of transmission should be set to indicate that when folding the 2-D data to provide a 3-D representation of the part, the deduction amount should be applied through the 3-D model to more accurately represent the physical characteristics of the sheet metal part when it is folded. If, however, the customers specifications are provided in 3-D, then the UNFOLD mode of transmission should be set to indicate that when unfolding the 3-D model to form the 2-D model of the part, the deduction amount should be applied to the 2-D model to more accurately represent the characteristics of the metal when unfolded. The input to the Set_Fold_Mode function should include the part name as well as a flag for setting the FOLD or UNFOLD mode of transmission.

A Set_Base_Face mode may also be provided as an API function for the purpose of permitting a user to set or modify the defined base face of a part. Since the data and views for a part model may be defined according to the base face of the part, selection of the base face will effect the global coordinates to be used to orient the part and to produce its layout and orthographic views. As such, for any given part, a user may wish to redefine or set the base face. Input for the Set_Base_Face function should include the part name as well as the base face name. Once again, a graphical user interface may be provided to permit the user to select the base face through the aid of a display screen and an input device, such as a mouse device or keyboard.

In addition to sending the part as a flat version or a collection of faces, an option may be provided to the user to send a 3-D version of the part to the 2-D CAD program. As such, a Send_Folded function may be provided. This function may be useful when the 2-D CAD program is capable of accepting raw 3-D geometry and includes unfolding capabilities or algorithms for forming a 2-D model of the part from the raw 3-D geometry data. The input for this function should include the part name as well as the folded version of the part written in a buffer as a set of edges in 3-D space. The buffer containing the part data may be configured according to the face, loop and edge format discussed above with reference to FIGS. 7A, 7B, 8A and 8B.

With the various features of the present invention, a wide variety of tasks may be accomplished when designing and modeling a part. For example, the invention may be utilized to initialize a part, create faces and bendlines, automatically detect collinear bendlines, set and update bending parameters, edit a part, fold or unfold a part, and send a flat or folded version of a part to the CAD application program environment.

While the invention has been described with reference to several exemplary embodiments and disclosed features, it is understood that the words which have been used herein are words of description and illustration, rather than words of limitation. Changes may be made within the purview of the appended claims, as presently stated and as amended, without departing from the scope and spirit of the invention and its aspects.

For example, additional API functions may be provided to enhance the features of the present invention. By way of a non-limiting example, a set of API functions could be provided to permit the transfer of text messages or other types of messages between the application environments. Further, while various exemplary user interfaces and display screens have been disclosed and illustrated herein, the present invention is not limited to such embodiments and configurations. Similar graphical user interfaces to that disclosed herein may be provided which permit editing, viewing and modification of a part in 2-D space as well as 3-D space.

Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed:

1. An interface for transferring part data between two application environments, one of said application environments including a computer-aided design (CAD) program that processes 2-D part data and the other of said application environments including an object oriented bend model program that is capable of processing 2-D part data and 3-D part data, said interface comprising:

an inter-process communication system that establishes an inter-process communication path between said CAD program and said object oriented bend model program; and a library of application program interface (API) functions that may be called by said CAD program and said object oriented bend model program to transfer and exchange part data through said inter-process communication path.

2. The interface for transferring part data according to claim 1, wherein said part data comprises data defining a sheet metal part including a plurality of faces, said library of API functions comprising a Send_Faces function for transferring the data defining the sheet metal part as a collection of attached faces.

3. The interface for transferring part data according to claim 2, wherein the data that is transferred with said Send_Faces function is provided in a buffer that comprises a part name, a set of face data, and bending parameter data.

4. The interface for transferring part data according to claim 3, wherein the set of face data comprises loop data for each face of said sheet metal part, said loop data including data defining a bounding loop of each face.

5. The interface for transferring part data according to claim 2, wherein said library of API functions further comprises an Add_Face function for transferring face data defining a face that is to be added to the data defining the sheet metal part.

6. The interface for transferring part data according to claim 5, wherein a set of input data that is provided to the Add_Face function includes a part name, a face name, and the face data, the face data including loop data defining a bounding loop of the face to be added to the sheet metal part.

7. The interface for transferring part data according to claim 2, wherein said library of API functions further comprises a Delete_Face function for transferring face data defining a face that is to be deleted from the data defining the sheet metal part.

8. The interface for transferring part data according to claim 7, wherein a set of input data that is provided to the Delete_Face function includes a part name and a face name of the face to be deleted from the sheet metal part.

9. The interface for transferring part data according to claim 2, wherein said library of API functions further comprises a Delete_Bendline function for transferring data defining a bendline that is to be deleted from the sheet metal part.

10. The interface for transferring part data according to claim 9, wherein a set of input data that is provided to the Delete_Bendline function includes a part name, a name of a first face of the sheet metal part that is adjacent to the bendline to be deleted, and a name of a second face of the sheet metal part that is adjacent to the bendline to be deleted.

11. The interface for transferring part data according to claim 2, wherein said library of API functions further comprises an Attach_Faces function for transferring data defining faces of the sheet metal part that are to be attached.

12. The interface for transferring part data according to claim 11, wherein the data transferred by the Attach_Faces function includes a buffer comprising a part name, a set of edge names of a first face of the sheet metal part that is to be attached, a set of edges names of a second face of the sheet metal part that is to be attached, and attachment parameters for attaching the edges of the first and second faces.

13. The interface for transferring part data according to claim 2, wherein said library of API functions further comprises a Set_Bending_Parameters function for transferring data defining bending parameters that are to be set for a bendline of the sheet metal part that is defined between a first adjacent face and a second adjacent face.

14. The interface for transferring part data according to claim 13, wherein a set of input data that is provided to the Set_Bending_Parameters function includes a part name, a name of the first adjacent face, a name of the second adjacent face, and the bending parameters that are to be set for the bendline.

15. The interface for transferring part data according to claim 14, wherein the bending parameters that are transferred with said Set_Bending_Parameters function comprises one of a bending angle, a bend type, a bend deduction amount, and an inside radius of the bend.

16. The interface for transferring part data according to claim 2, wherein said library of API functions further comprises a Shift_Face function for transferring data defining a second face of the sheet metal part that is to be shifted with respect to a first face of the sheet metal part.

17. The interface for transferring part data according to claim 16, wherein the data transferred by the Shift_Face function includes a buffer comprising a part name, a name of the first face, a name of the second face, and a shift amount indicating the amount by which the second face is to be shifted with respect to the first face.

18. The interface for transferring part data according to claim 1, wherein said part data comprises data defining a sheet metal part, said library of API functions comprising a Send_Flat function for transferring the data defining the sheet metal part as a flat version of the part.

19. The interface for transferring part data according to claim 18, wherein the data that is transferred with said Send_Flat function is provided in a buffer that comprises a part name, a set of edges defining the flat version of the part, and a set of default bending parameters for the part.

20. The interface for transferring part data according to claim 1, wherein said part data comprises data defining a sheet metal part, said library of API functions comprising a Send_Folded function for transferring the data defining the sheet metal part as a folded version of the part.

21. The interface for transferring part data according to claim 20, wherein the data that is transferred with said Send_Folded function is provided in a buffer that comprises a part name, and a set of edges defining the folded version of the part.

22. The interface for transferring part data according to claim 1, wherein said inter-process communication path is established in accordance with a predetermined message protocol, said predetermined message protocol comprising dynamic data exchange (DDE).

23. The interface for transferring part data according to claim 1, wherein said part data is transferred in real-time without uploading or downloading the part data from a data file.

24. A method for transferring part data between two application environments, one of said application environments including a computer-aided design (CAD) program that processes 2-D part data and the other of said application environments including an object oriented bend model program that is capable of processing 2-D part data and 3-D part data, said method comprising:
 establishing an inter-process communication path between said CAD program and said object oriented bend model program;
 defining a library of application program interface (API) functions that may be called by said CAD program and said object oriented bend model program to transfer part data through said inter-process communication path;
 calling one of said API functions of said library; and
 transferring part data between said CAD program and said object oriented bend model program based on the API function that was called from said library.

25. The method for transferring part data according to claim 24, wherein said part data comprises data defining a sheet metal part including a plurality of faces, and said method further comprises calling a Send_Faces function from said library and transferring the data defining the sheet metal part as a collection of attached faces in response to the Send_Faces function being called from said library.

26. The method for transferring part data according to claim 25, further comprising providing, when said Send_Faces function is called from said library, a buffer that comprises a part name, a set of face data, and bending parameter data in order to transfer the data defining the sheet metal part.

27. The method for transferring part data according to claim 26, wherein the set of face data comprises loop data for each face of said sheet metal part, said loop data including data defining a bounding loop of each face.

28. The method for transferring part data according to claim 25, further comprising calling an Add_Face function from said library and transferring, in response to the Add_Face function being called from said library, face data defining a face that is to be added to the data defining the sheet metal part.

29. The method for transferring part data according to claim 28, further comprising providing a set of input data, when calling the Add_Face function, that includes a part name, a face name, and the face data, the face data including loop data defining a bounding loop of the face to be added to the sheet metal part.

30. The method for transferring part data according to claim 25, further comprising calling a Delete_Face function from said library and transferring, in response to the Delete_Face function being called from said library, face data defining a face that is to be deleted from the data defining the sheet metal part.

31. The method for transferring part data according to claim 30, further comprising providing a set of input data, when calling the Delete_Face function, that includes a part name and a face name of the face to be deleted from the sheet metal part.

32. The method for transferring part data according to claim 25, further comprising calling an Attach_Faces function from said library and transferring, in response to the Attach_Faces function being called from said library, data defining faces of the sheet metal part that are to be attached.

33. The method for transferring part data according to claim 32, further comprising providing, when the Attach_Faces function is called from said library, a buffer comprising a part name, a set of edge names of a first face of the sheet metal part that is to be attached, a set of edges names of a second face of the sheet metal part that is to be attached, and attachment parameters for attaching the edges of the first and second faces.

34. The method for transferring part data according to claim 23, further comprising calling a Set_Bending_Parameters function from said library and transferring, when said Set_Bending_Parameters function is called from said library, data defining bending parameters that are to be set for a bendline of the sheet metal part that is defined between a first adjacent face and a second adjacent face.

35. The method for transferring part data according to claim 34, further comprising providing a set of input data, when calling the Set_Bending_Parameters function, that includes a part name, a name of the first adjacent face, a name of the second adjacent face, and the bending parameters that are to be set for the bendline.

36. The method for transferring part data according to claim 25, further comprising calling a Shift_Face function from said library and transferring, when said Shift_Face function is called from said library, data defining a second face of the sheet metal part that is to be shifted with respect to a first face of the sheet metal part.

37. The method for transferring part data according to claim 36, further comprising providing, when the Shift_Face function is called from said library, a buffer comprising a part name, a name of the first face, a name of the second face, and a shift amount indicating the amount by which the second face is to be shifted with respect to the first face.

38. The method for transferring part data according to claim 24, wherein said part data comprises data defining a sheet metal part, and said method further comprises calling a Send_Flat function from said library and transferring, when said Send_Flat function is called from said library, the data defining the sheet metal part as a flat version of the part.

39. The method for transferring part data according to claim 38, further comprising providing, when said Send_Flat function is called from said library, a buffer that comprises a part name, a set of edges defining the flat version of the part, and a set of default bending parameters for the part.

40. The method for transferring part data according to claim 24, wherein said establishing comprises establishing said inter-process communication path in accordance with a predetermined message protocol, said predetermined message protocol comprising dynamic data exchange (DDE).

41. The method for transferring part data according to claim 24, wherein said part data is transferred in real-time without uploading or downloading the part data from a data file.

42. A method for transferring part data between two application environments, one of said application environments including a computer-aided design (CAD) program that processes 2-D part data and the other of said application environments including an object-oriented bend model program that is capable of processing 2-D and 3-D part data, said part data including data defining a sheet metal part, said method comprising:
  establishing an inter-process communication path between said CAD program and said object oriented bend model program;
  defining a library of application program interface (API) functions to transfer part data through said inter-process communication path;
  determining a set of input data for one of said API functions of said library;
  calling said one of said API functions and providing, as input to said one of said API functions, the set of input data; and
  transferring, with said inter-process communication path, the set of input data between said CAD program and said object oriented bend model program in accordance with said one of said API functions that was called from said library.

43. A method for transferring part data according to claim 42, wherein said determining a set of input data comprises:
  identifying a part name of the sheet metal part;
  identifying a set of edge of a first face of the sheet metal part that is to be attached;
  identifying a set of edges of a second face of the sheet metal part that is to be attached to the set of edges of the first face;
  defining attachment parameters for attaching the edges of the first and second faces; and
  providing, as the set of input data, the part name, a set of edge names of the edges of the first face of the sheet metal part, a set of edges names of the edges of the second face of the sheet metal part, and the attachment parameters for attaching the edges of the first and second faces,
  and further wherein said calling comprises calling an Attach_Faces function from said library of API functions to transfer the set of input data and attach the first and second faces of the sheet metal part.

44. A method for transferring part data according to claim 40, wherein said determining a set of input data comprises:
  identifying a part name of the sheet metal part;
  identifying a first face of the sheet metal part;
  identifying a second face of the sheet metal part that is to be shifted with respect to the first face;
  defining a shift amount for shifting the second face with respect to the first face; and
  providing, as the set of input data, the part name, a name of the first face of the sheet metal part, a name of the second face of the sheet metal part, and the shift amount, and further wherein said calling comprises calling a Shift_Face function from said library of API functions to transfer the set of input data and shift the second face with respect to the firs face of the sheet metal part.

45. The method for transferring part data according to claim 42, wherein said part data is transferred in real-time without uploading or downloading the part data from a data file.

* * * * *